(12) United States Patent
    Jain

(10) Patent No.: US 8,776,189 B2
(45) Date of Patent: *Jul. 8, 2014

(54) WIRELESSLY ACCESSING BROADBAND SERVICES USING INTELLIGENT CARDS

(75) Inventor: Deepak Jain, Garland, TX (US)

(73) Assignee: DeviceFidelity, Inc., Richardson, TX (US)

( * ) Notice: Subject to any disclaimer, the term of this patent is extended or adjusted under 35 U.S.C. 154(b) by 982 days.

This patent is subject to a terminal disclaimer.

(21) Appl. No.: 12/209,950

(22) Filed: Sep. 12, 2008

(65) Prior Publication Data
    US 2009/0070861 A1    Mar. 12, 2009

Related U.S. Application Data

(60) Provisional application No. 60/971,813, filed on Sep. 12, 2007.

(51) Int. Cl.
    *H04L 29/06*    (2006.01)
    *G06F 21/34*    (2013.01)

(52) U.S. Cl.
    CPC ..................................... *G06F 21/34* (2013.01)
    USPC .............................................................. 726/5

(58) Field of Classification Search
    CPC ........ G06F 21/35; G06F 21/34; G06F 21/123
    USPC ............... 726/5–7, 28, 29; 713/172, 185, 186
    See application file for complete search history.

(56) References Cited

U.S. PATENT DOCUMENTS 3,713,148 A    1/1973  Cardullo et al.
4,614,861 A    9/1986  Pavlov et al.

(Continued)

FOREIGN PATENT DOCUMENTS

CN    1610918        4/2005
DE    103 17 394 A1  11/2004

(Continued)

OTHER PUBLICATIONS

Notification of Transmittal of the International Search Report and the Written Opinion of the International Searching Authority, or the Declaration issued in PCT/US2008/076275 on Apr. 16, 2009, 15 pages.

(Continued)

*Primary Examiner* — Hadi Armouche
*Assistant Examiner* — Dao Ho
(74) *Attorney, Agent, or Firm* — Fish & Richardson P.C.

(57) ABSTRACT

The present disclosure is directed to a system and method for wirelessly accessing broadband services using intelligent cards. In some implementations, a broadband service card includes a physical interface, a communication module, secure memory, and service module. The physical interface connects to a port of a consumer host device. The communication module wirelessly receives RF signals from and transmits RF signals to a wireless broadband network. The secure memory stores user credentials used to securely authenticate the card and access a service foreign to the consumer host device through the wireless broadband network independent of the consumer host device. The user credentials are associated with a broadband service provider. The service module accesses the foreign service using the user credentials in response to at least an event and transmits a service request to the broadband service provider using the wireless broadband core network.

29 Claims, 9 Drawing Sheets

(56) References Cited

U.S. PATENT DOCUMENTS

| | | |
|---|---|---|
| 4,766,293 A | 8/1988 | Boston |
| 4,797,542 A | 1/1989 | Hara |
| 4,876,441 A | 10/1989 | Hara et al. |
| 5,140,517 A | 8/1992 | Nagata et al. |
| 5,180,902 A | 1/1993 | Schick et al. |
| 5,272,319 A | 12/1993 | Rey |
| 5,276,311 A | 1/1994 | Hennige |
| 5,434,398 A | 7/1995 | Goldberg |
| 5,528,222 A | 6/1996 | Moskowitz et al. |
| 5,729,607 A | 3/1998 | DeFries et al. |
| 5,748,737 A | 5/1998 | Daggar |
| 5,768,370 A | 6/1998 | Maatta et al. |
| 5,801,661 A | 9/1998 | Suzuki |
| 5,834,747 A | 11/1998 | Cooper |
| 6,029,892 A | 2/2000 | Miyake |
| 6,032,859 A | 3/2000 | Muehlberger et al. |
| 6,041,305 A | 3/2000 | Sakurai |
| 6,045,043 A | 4/2000 | Bashan et al. |
| 6,073,840 A | 6/2000 | Marion |
| 6,073,856 A | 6/2000 | Takahashi |
| 6,078,806 A | 6/2000 | Heinonen et al. |
| 6,233,683 B1 | 5/2001 | Chan et al. |
| 6,308,890 B1 | 10/2001 | Cooper |
| 6,347,218 B1 | 2/2002 | Fuhrmann et al. |
| 6,407,914 B1 | 6/2002 | Helot |
| 6,418,326 B1 | 7/2002 | Heinonen et al. |
| 6,484,259 B1 * | 11/2002 | Barlow ................ 713/159 |
| 6,533,178 B1 | 3/2003 | Gaul et al. |
| 6,625,425 B1 | 9/2003 | Hughes et al. |
| 6,634,564 B2 | 10/2003 | Kuramochi |
| 6,764,005 B2 | 7/2004 | Cooper |
| 6,771,981 B1 | 8/2004 | Zalewski et al. |
| 6,829,711 B1 | 12/2004 | Kwok et al. |
| 6,853,987 B1 | 2/2005 | Cook |
| 6,891,811 B1 | 5/2005 | Smith et al. |
| 6,920,338 B2 | 7/2005 | Engstrom et al. |
| 6,961,587 B1 | 11/2005 | Vilppula et al. |
| 6,970,130 B1 | 11/2005 | Walters et al. |
| 7,012,572 B1 | 3/2006 | Schaffner et al. |
| 7,079,832 B2 | 7/2006 | Zalewski et al. |
| 7,083,094 B2 | 8/2006 | Cooper |
| 7,113,139 B2 | 9/2006 | Charrat |
| 7,128,274 B2 | 10/2006 | Kelley et al. |
| 7,133,659 B2 | 11/2006 | Zalewski et al. |
| 7,147,165 B2 | 12/2006 | Mongin et al. |
| 7,155,199 B2 | 12/2006 | Zalewski et al. |
| 7,183,505 B2 | 2/2007 | Mongin et al. |
| 7,224,797 B2 | 5/2007 | Freeman et al. |
| 7,228,155 B2 | 6/2007 | Saunders |
| 7,232,061 B2 | 6/2007 | Furuyama et al. |
| 7,286,818 B2 | 10/2007 | Rosenberg ................ 455/414.1 |
| 7,290,716 B2 | 11/2007 | Ito |
| 7,305,260 B2 | 12/2007 | Vuoir et al. |
| 7,334,732 B2 | 2/2008 | Cooper |
| 7,343,184 B2 | 3/2008 | Rostami |
| 7,364,092 B2 | 4/2008 | Narendra et al. |
| 7,395,975 B2 | 7/2008 | Ito |
| 7,407,094 B2 | 8/2008 | Myers et al. |
| 7,494,068 B2 | 2/2009 | Patrice |
| 7,509,487 B2 | 3/2009 | Lu et al. |
| 7,530,495 B2 | 5/2009 | Cooper |
| 7,537,169 B2 | 5/2009 | Gonzalez et al. |
| 7,575,177 B2 | 8/2009 | Killian et al. |
| 7,581,678 B2 | 9/2009 | Narendra et al. |
| 7,588,184 B2 | 9/2009 | Gandel et al. |
| 7,599,857 B2 | 10/2009 | Bishop et al. |
| 7,601,031 B2 | 10/2009 | Tanaka et al. |
| 7,604,176 B2 | 10/2009 | Bates et al. |
| 7,606,560 B2 | 10/2009 | Labrou et al. |
| 7,609,946 B2 | 10/2009 | Schedivy |
| 7,623,832 B2 | 11/2009 | Watanabe et al. |
| 7,657,255 B2 | 2/2010 | Abel et al. |
| 7,707,113 B1 | 4/2010 | DiMartino et al. |
| 7,719,613 B2 | 5/2010 | Kayanuma |
| 7,748,031 B2 | 6/2010 | Gonzalez et al. |
| 7,774,231 B2 | 8/2010 | Pond et al. |
| 7,789,313 B2 | 9/2010 | Degauque et al. |
| 7,805,615 B2 | 9/2010 | Narendra et al. |
| 7,821,399 B2 | 10/2010 | Otranen |
| 2001/0006902 A1 | 7/2001 | Ito |
| 2001/0054087 A1 | 12/2001 | Flom et al. |
| 2002/0017557 A1 | 2/2002 | Hendrick |
| 2002/0023215 A1 | 2/2002 | Wang et al. |
| 2002/0055368 A1 | 5/2002 | Lee |
| 2002/0065902 A1 | 5/2002 | Janik et al. |
| 2002/0128029 A1 | 9/2002 | Nishikawa et al. |
| 2003/0046365 A1 | 3/2003 | Pfister et al. |
| 2003/0052168 A1 | 3/2003 | Wong |
| 2003/0064689 A1 | 4/2003 | Engstrom et al. |
| 2003/0085288 A1 | 5/2003 | Luu |
| 2003/0100338 A1 | 5/2003 | Lee |
| 2003/0135463 A1 | 7/2003 | Brown et al. |
| 2003/0145205 A1 | 7/2003 | Sarcanin |
| 2003/0172028 A1 | 9/2003 | Abell et al. |
| 2003/0186729 A1 | 10/2003 | Engstrom et al. |
| 2003/0204845 A1 | 10/2003 | Sibley et al. |
| 2003/0224831 A1 | 12/2003 | Engstrom et al. |
| 2004/0064612 A1 | 4/2004 | Pinto et al. |
| 2004/0070952 A1 | 4/2004 | Higuchi et al. |
| 2004/0073519 A1 | 4/2004 | Fast |
| 2004/0083275 A1 | 4/2004 | Strisower |
| 2004/0097256 A1 | 5/2004 | Kujawski |
| 2004/0127256 A1 | 7/2004 | Goldthwaite et al. |
| 2004/0209648 A1 | 10/2004 | Chen |
| 2004/0220964 A1 | 11/2004 | Shiftan et al. |
| 2004/0238857 A1 | 12/2004 | Beroz et al. |
| 2004/0256469 A1 | 12/2004 | Faenza et al. |
| 2005/0022002 A1 | 1/2005 | Poisner |
| 2005/0023359 A1 | 2/2005 | Saunders |
| 2005/0027543 A1 | 2/2005 | Labrou et al. |
| 2005/0055549 A1 | 3/2005 | Fischer |
| 2005/0074123 A1 * | 4/2005 | Cromer et al. ................ 380/270 |
| 2005/0090280 A1 | 4/2005 | Nielsen |
| 2005/0108571 A1 * | 5/2005 | Lu et al. ................ 713/201 |
| 2005/0114780 A1 | 5/2005 | Turgeman |
| 2005/0119936 A1 | 6/2005 | Buchanan et al. |
| 2005/0182710 A1 | 8/2005 | Andersson et al. |
| 2005/0182926 A1 | 8/2005 | Akashika et al. |
| 2005/0197169 A1 | 9/2005 | Son |
| 2005/0212690 A1 | 9/2005 | Nishikawa |
| 2005/0224589 A1 | 10/2005 | Park et al. |
| 2005/0269401 A1 | 12/2005 | Spitzer et al. |
| 2005/0269402 A1 | 12/2005 | Spitzer et al. |
| 2005/0286212 A1 | 12/2005 | Brignone et al. |
| 2006/0008256 A1 * | 1/2006 | Khedouri et al. ................ 386/124 |
| 2006/0056397 A1 | 3/2006 | Aizu et al. |
| 2006/0074698 A1 | 4/2006 | Bishop et al. |
| 2006/0089123 A1 | 4/2006 | Frank |
| 2006/0160560 A1 | 7/2006 | Josenhans et al. |
| 2006/0186209 A1 | 8/2006 | Narendra et al. |
| 2006/0219776 A1 | 10/2006 | Finn |
| 2006/0226217 A1 | 10/2006 | Narendra et al. |
| 2006/0231623 A1 | 10/2006 | Brown et al. |
| 2006/0287004 A1 | 12/2006 | Fuqua |
| 2006/0287964 A1 | 12/2006 | Brown |
| 2006/0291483 A1 | 12/2006 | Sela |
| 2007/0011724 A1 | 1/2007 | Gonzalez et al. |
| 2007/0014407 A1 | 1/2007 | Narendra et al. |
| 2007/0014408 A1 | 1/2007 | Narendra et al. |
| 2007/0016798 A1 | 1/2007 | Narendra et al. |
| 2007/0023532 A1 | 2/2007 | Narendra et al. |
| 2007/0053306 A1 | 3/2007 | Stevens |
| 2007/0057038 A1 | 3/2007 | Gannon |
| 2007/0099592 A1 | 5/2007 | Thome et al. |
| 2007/0113260 A1 | 5/2007 | Pua et al. |
| 2007/0145135 A1 | 6/2007 | Jogand-Coulomb et al. |
| 2007/0145152 A1 | 6/2007 | Jogand-Coulomb et al. |
| 2007/0152035 A1 | 7/2007 | Adams et al. |
| 2007/0155430 A1 | 7/2007 | Cheon et al. ................ 455/558 |
| 2007/0156436 A1 | 7/2007 | Fisher et al. |
| 2007/0156933 A1 | 7/2007 | Pinto et al. |
| 2007/0170256 A1 | 7/2007 | Breitfuss |
| 2007/0194105 A1 | 8/2007 | Kissick |
| 2007/0206743 A1 | 9/2007 | Chang |

(56) References Cited

U.S. PATENT DOCUMENTS

| | | | |
|---|---|---|---|
| 2007/0253251 A1 | 11/2007 | Mizushima et al. | |
| 2007/0254712 A1 | 11/2007 | Chitti | |
| 2008/0003882 A1 | 1/2008 | Ni et al. | |
| 2008/0010372 A1* | 1/2008 | Khedouri et al. | 709/224 |
| 2008/0026752 A1* | 1/2008 | Flore et al. | 455/435.2 |
| 2008/0051059 A1 | 2/2008 | Fisher | 455/410 |
| 2008/0051122 A1 | 2/2008 | Fisher | |
| 2008/0052192 A1 | 2/2008 | Fisher | |
| 2008/0052233 A1 | 2/2008 | Fisher et al. | |
| 2008/0054079 A1 | 3/2008 | Mullen | |
| 2008/0077950 A1 | 3/2008 | Burke et al. | |
| 2008/0090527 A1 | 4/2008 | Atkinson et al. | |
| 2008/0092212 A1* | 4/2008 | Patel et al. | 726/3 |
| 2008/0093467 A1 | 4/2008 | Narendra et al. | |
| 2008/0099559 A1 | 5/2008 | Lo et al. | |
| 2008/0144650 A1 | 6/2008 | Boch et al. | |
| 2008/0244208 A1 | 10/2008 | Narendra et al. | |
| 2008/0263363 A1* | 10/2008 | Jueneman et al. | 713/184 |
| 2008/0263680 A1 | 10/2008 | Bertin | |
| 2008/0277484 A1 | 11/2008 | Launay et al. | |
| 2008/0279381 A1 | 11/2008 | Narendra et al. | |
| 2008/0290160 A1 | 11/2008 | Huot et al. | |
| 2008/0305772 A1* | 12/2008 | Balasubramanian et al. | 455/411 |
| 2008/0308641 A1 | 12/2008 | Finn | |
| 2009/0002167 A1 | 1/2009 | Mosteller | |
| 2009/0006722 A1 | 1/2009 | McAvoy et al. | |
| 2009/0015198 A1 | 1/2009 | Brandenburg | |
| 2009/0024533 A1 | 1/2009 | Fernandes et al. | |
| 2009/0040116 A1 | 2/2009 | Eray | |
| 2009/0064045 A1 | 3/2009 | Tremblay | |
| 2009/0065571 A1 | 3/2009 | Jain | |
| 2009/0065572 A1 | 3/2009 | Jain | |
| 2009/0068982 A1 | 3/2009 | Chen et al. | |
| 2009/0098825 A1 | 4/2009 | Huomo et al. | |
| 2009/0103732 A1 | 4/2009 | Benteo et al. | |
| 2009/0108063 A1 | 4/2009 | Jain et al. | |
| 2009/0115571 A1 | 5/2009 | Bishop et al. | |
| 2009/0127345 A1 | 5/2009 | Chamley et al. | |
| 2009/0137152 A1 | 5/2009 | Tanaka et al. | |
| 2009/0137204 A1 | 5/2009 | Chang | |
| 2009/0143104 A1 | 6/2009 | Loh et al. | |
| 2009/0152361 A1 | 6/2009 | Narendra et al. | |
| 2009/0169013 A1 | 7/2009 | Fascenda et al. | |
| 2009/0177530 A1 | 7/2009 | King et al. | |
| 2009/0181735 A1 | 7/2009 | Griffin et al. | |
| 2009/0192935 A1 | 7/2009 | Griffin et al. | |
| 2009/0193500 A1 | 7/2009 | Griffin et al. | |
| 2009/0210569 A1 | 8/2009 | Lusetti et al. | |
| 2009/0216681 A1 | 8/2009 | McCown | |
| 2009/0224888 A1 | 9/2009 | Caruana | |
| 2009/0234760 A1 | 9/2009 | Walter | |
| 2009/0235037 A1 | 9/2009 | Mounier et al. | |
| 2009/0298540 A1 | 12/2009 | Narendra et al. | |
| 2010/0022273 A1 | 1/2010 | Patrice | |
| 2010/0107230 A1 | 4/2010 | Tyagi et al. | |
| 2010/0114773 A1 | 5/2010 | Skowronek | |
| 2010/0136913 A1 | 6/2010 | Picquenot et al. | |
| 2010/0162377 A1 | 6/2010 | Gonzales et al. | |
| 2010/0203870 A1 | 8/2010 | Hubinak et al. | |
| 2010/0205373 A1 | 8/2010 | He et al. | |
| 2010/0213265 A1 | 8/2010 | Narendra et al. | |
| 2010/0258639 A1 | 10/2010 | Florek et al. | |
| 2010/0262840 A1 | 10/2010 | Benteo et al. | |
| 2010/0264211 A1 | 10/2010 | Jain et al. | |
| 2010/0274712 A1 | 10/2010 | Mestre et al. | |
| 2011/0145049 A1 | 6/2011 | Hertel et al. | |

FOREIGN PATENT DOCUMENTS

| | | |
|---|---|---|
| DE | 20 2006 001 690 U1 | 4/2006 |
| EP | 1 111 557 A2 | 6/2001 |
| EP | 1 306 760 A1 | 5/2003 |
| EP | 1 626 349 A1 | 2/2006 |
| EP | 1 770 601 A1 | 4/2007 |
| EP | 1 773 059 A1 | 4/2007 |
| EP | 1 933 259 A1 | 6/2008 |
| JP | 4083447 | 3/1992 |
| WO | WO 91/12698 | 8/1991 |
| WO | WO 99/34314 A1 | 7/1999 |
| WO | WO 00/28490 A1 | 5/2000 |
| WO | WO 01/22695 A1 | 3/2001 |
| WO | WO 01/48688 A1 | 7/2001 |
| WO | WO 02/11074 | 2/2002 |
| WO | WO 2005/119607 A1 | 12/2005 |
| WO | WO 2005/119608 A1 | 12/2005 |
| WO | WO 2006/086232 A2 | 8/2006 |
| WO | WO 2006/091709 A2 | 8/2006 |
| WO | WO 2006/108184 A1 | 10/2006 |
| WO | WO 2007/011937 A2 | 1/2007 |
| WO | WO 2007/011990 A2 | 1/2007 |
| WO | WO 2007/011991 A2 | 1/2007 |
| WO | WO 2007/011992 A1 | 1/2007 |
| WO | WO 2007/052151 | 5/2007 |
| WO | WO 2007/088898 A1 | 8/2007 |
| WO | WO 2007/125223 A2 | 11/2007 |

OTHER PUBLICATIONS

International Preliminary Report on Patentability issued in International Application No. PCT/US2008/076046 on May 21, 2010; 13 pages.

U.S. Appl. No. 12/678,052 entitled "Updating Mobile Devices with Additional Elements", inventors Jain et al., filed Mar. 12, 2010.

Office Action issued in U.S. Appl. No. 12/209,087 on Jul. 7, 2010; 36 pages.

U.S. Appl. No. 12/678,047 entitled "Wirelessly Accessing Broadband Services Using Intelligent Covers", inventors Jain et al., filed Mar. 12, 2010.

U.S. Appl. No. 12/678,085 entitled "Receiving Broadcast Signals Using Intelligent Covers for Mobile Devices", inventors Jain et al., filed Mar. 12, 2010.

Onelook Dictionary Search; Definitions of firmware; Jul. 5, 2011; 2 pages.

Office Action issued in U.S. Appl. No. 12/205,807 on Jul. 14, 2011; 16 pages.

Office Action issued in U.S. Appl. No. 12/205,821 on Apr. 1, 2011; 15 pages.

Office Action issued in U.S. Appl. No. 12/205,821 on Jun. 15, 2011; 15 pages.

Office Action issued in U.S. Appl. No. 12/568,592 on Jun. 27, 2011; 11 pages.

Office Action issued in U.S. Appl. No. 12/571,163 on Jun. 16, 2011; 10 pages.

U.S. Appl. No. 60/222,475 entitled "Electronic Device Cover With Embedded Radio Frequency (RF) Transponder and Methods of Using Same", inventor Zalewski, filed Aug. 2, 2000; 46 pages.

Office Action issued in U.S. Appl. No. 12/205,821 on Oct. 13, 2010; 15 pages.

Office Action issued in U.S. Appl. No. 12/206,564 on Nov. 23, 2010; 15 pages.

Communication Pursuant to Article 94(3) EPC issued in European Application No. 08830698.0 on Nov. 29, 2010; 5 pages.

Communication Pursuant to Article 94(3) EPC issued in European Application No. 08830136.1 on Nov. 29, 2010; 3 pages.

U.S. Appl. No. 12/776,285 entitled "Magnetically Coupling Radio Frequency Antennas", inventor Jain, filed May 7, 2010.

Advisory Action issued in U.S. Appl. No. 12/205,807 on Sep. 26, 2011; 3 pages.

Office Action issued in U.S. Appl. No. 12/205,814 on Sep. 15, 2011; 20 pages.

Office Action issued in U.S. Appl. No. 12/210,161 on Sep. 2, 2011; 10 pages.

Office Action issued in U.S. Appl. No. 12/272,527 on Sep. 9, 2011; 8 pages.

Notice of Allowance issued in U.S. Appl. No. 12/568,592 on Sep. 30, 2011; 7 pages.

International Preliminary Report on Patentability issued in International Application No. PCT/US2009/061018 on Sep. 26, 2011; 6 pages.

(56) References Cited

OTHER PUBLICATIONS

Communication Pursuant to Article 94(3) EPC issued in EP Application No. 08 830 698.0-1246, dated Sep. 12, 2011, 4 pages.
Office Action issued in U.S. Appl. No. 12/205,807 on Feb. 23, 2011; 15 pages.
Notice of Allowance issued in U.S. Appl. No. 12/206,564 on Mar. 3, 2011; 8 pages.
Notice of Allowance issued in U.S. Appl. No. 12/209,810 on Feb. 2, 2011; 8 pages.
Office Action issued in U.S. Appl. No. 12/272,527 on Mar. 16, 2011; 8 pages.
Communication under Rule 71(3) issued in European Application No. 08830004.1 on Dec. 22, 2010; 70 pages.
U.S. Appl. No. 12/205,796, titled Wirelessly Executing Financial Transactions, inventor Jain, filed Sep. 5, 2009.
U.S. Appl. No. 12/205,807, titled Interfacign Transaction Cards With Host Devices, inventor Jain, filed Sep. 5, 2008.
U.S. Appl. No. 12/205,814, titled Presenting Web Pages Through Mobile Host Devices, inventor Jain, filed Sep. 5, 2009.
U.S. Appl. No. 12/205,821, titled Selectively Switching Antennas of Transaction Cards, inventor Jain, filed Sep. 5, 2008.
U.S. Appl. No. 12/206,564, titled Wirelessly Executing Transactions With Different Enterprises, inventor Jain, filed Sep. 8, 2008.
U.S. Appl. No. 12/209,810, titled Updating Mobile Devices With Additional Elements, inventors Jain et al., filed Sep. 12, 2008.
U.S. Appl. No. 12/210,167, titled Wirelessly Receiving Broadcast Signals Using Intelligent Cards, inventor Jain, filed Sep. 12, 2008.
U.S. Appl. No. 12/209,087, titled Wirelessly Executing Financial Transactions, inventor Jain, filed Sep. 11, 2008.
U.S. Appl. No. 12/210,161, titled Wirelessly Accessing Broadband Services Using Intelligent Covers, inventors Jain, et al., filed Sep. 12, 2008.
U.S. Appl. No. 12/210,176, titled Receiving Broadcast Signals Using Intelligent Covers for Mobile Devices, inventors Jain, et al., filed Sep. 12, 2008.
U.S. Appl. No. 12/272,527, titled Wirelessly Communicating Radio Frequency Signals, inventors Jain, et al., filed Nov. 17, 2008.
U.S. Appl. No. 12/568,592, titled Switching Between Internal and External Antennas, inventor Jain, filed Sep. 28, 2008.
U.S. Appl. No. 12/571,163, titled Amplifying Radio Frequency Signals, inventor Jain, filed Sep. 30, 2008.
International Preliminary Report on Patentability issued in International Application No. PCT/US2008/076318, filed Sep. 12, 2008, mailed Sep. 11, 2009, 12 pages.
International Search Report and Written Opinion issued in International Application No. PCT/US2008/076307 on May 26, 2009, 15 pages.
Notification of Transmittal of the International Search Report and the Written Opinion of the International Searching Authority for appl. No. PCT/US2008/075977 filed Sep. 11, 2008, mailed Dec. 29, 2008 (12 pages).
Notification of Transmittal of the International Search Report and the Written Opinion of the International Searching Authority for appl. No. PCT/US2008/076006 filed Sep. 11, 2008, mailed Dec. 16, 2008 (13 pages).
Notification of Transmittal of the International Search Report and the Written Opinion of the International Searching Authority for appl. No. PCT/US2008/076033 filed Sep. 11, 2008, mailed Jan. 5, 2009 (12 pages).
Notification of Transmittal of the International Search Report and the Written Opinion of the International Searching Authority for appl. No. PCT/US2008/076318 filed Sep. 12, 2008, mailed Feb. 2, 2009 (14 pages).
Notification of Transmittal of the International Search Report and the Written Opinion of the International Searching Authority for appl. No. PCT/US2008/076158 filed Sep. 12, 2008, mailed Dec. 11, 2008 (14 pages).
Notification of Transmittal of the International Search Report and the Written Opinion of the International Searching Authority for appl. No. PCT/US2008/076316 filed Sep. 12, 2008, mailed Jan. 13, 2009 (14 pages).
Notification of Transmittal of the International Search Report and the Written Opinion of the International Searching Authority for appl. No. PCT/US2008/076319 filed Sep. 12, 2008, mailed Jan. 14, 2009 (15 pages).
Uren P: *"Internet Smartcard Benefits for Internet Security Issues"* Campus-Wide Information Systems, Emerald Group Publishing Ltd., Bradford, GB, vol. 20, No. 3, Jan. 1, 2003, pp. 105-114 (XP008078638).
International Search Report and the Written Opinion of the International Searching Authority issued in International Application No. PCT/US2009/061018 Mar. 1, 2010, 14 pages.
International Search Report and the Written Opinion of the International Searching Authority issued in International Application No. PCT/US2009/061032, Mar. 3, 2010, 14 pages.
International Preliminary Report on Patentability issued in International Application No. PCT/US2008/076046, Mar. 16, 2010, 8 pages.
Office Action issued in U.S. Appl. No. 12/209,087 on Nov. 4, 2009, 42 pages.
Rankl, W., and Effing, W., *Smart Card Handbook*, Second Edition, John Wiley & Sons, Ltd., Sep. 18, 2000, 32 pages.
International Search Report and Written Opinion of the International Searching Authority issued in international Application No. PCT/US2008/076046, filed Sep. 11, 2008, mailed Jan. 8, 2010, 14 pages.
International Preliminary Report on Patentability issued in international Application No. PCT/US2008/075977, filed Sep. 11, 2008, mailed Dec. 30, 2009, 6 pages.
International Preliminary Report on Patentability issued in international Application No. PCT/US2008/076006, filed Sep. 11, 2008, mailed Dec. 29, 2009, 11 pages.
International Preliminary Report on Patentability issued in international Application No. PCT/US2008/076033, filed Sep. 11, 2008, mailed Dec. 29, 2009, 7 pages.
International Preliminary Report on Patentability issued in international Application No. PCT/US2008/076275, filed Sep. 12, 2008, mailed Dec. 10, 2009, 14 pages.
International Preliminary Report on Patentability issued in international Application No. PCT/US2008/076158, filed Sep. 12, 2008, mailed Dec. 29, 2009, 13 pages.
International Preliminary Report on Patentability issued in international Application No. PCT/US2008/076316, filed Sep. 12, 2008, mailed Nov. 27, 2009, 19 pages.
International Preliminary Report on Patentability issued in international Application No. PCT/US2008/076319, filed Sep. 12, 2008, mailed Dec. 16, 2009, 12 pages.
Office Action issued in U.S. Appl. No. 12/205,796 on Dec. 1, 2011; 13 pages.
Office Action issued in U.S. Appl. No. 12/205,814 on Feb. 28, 2012; 23 pages.
Notice of Allowance issued in U.S. Appl. No. 12/205,821 on Dec. 19, 2011; 11 pages.
Office Action issued in U.S. Appl. No. 13/367,022 on Mar. 13, 2012; 15 pages.
Office Action issued in U.S. Appl. No. 13/108,717 on Feb. 9, 2012; 19 pages.
Notice of Allowance issued in U.S. Appl. No. 13/074,744 on Dec. 14, 2011; 10 pages.
Office Action issued in U.S. Appl. No. 12/210,167 on Dec. 16, 2011; 15 pages.
Office Action issued in U.S. Appl. No. 12/210,161 on Dec. 20, 2011; 14 pages.
Notice of Allowance issued in U.S. Appl. No. 12/210,161 on Mar. 2, 2012; 10 pages.
Office Action issued in U.S. Appl. No. 12/210,176 on Nov. 2, 2011; 21 pages.
Office Action issued in U.S. Appl. No. 12/210,176 on Apr. 5, 2012; 19 pages.
Office Action issued in U.S. Appl. No. 12/571,163 on Nov. 9, 2011; 9 pages.

(56) References Cited

OTHER PUBLICATIONS

Office Action issued in U.S. Appl. No. 12/776,285 on Mar. 23, 2012; 14 pages.
International Preliminary Report on Patentability issued in International Application No. PCT/US2009/061032 on Jan. 18, 2012; 17 pages.
International Search Report and Written Opinion of the International Searching Authority issued in International Application No. PCT/US2011/035548 on Dec. 14, 2011; 8 pages.
Office Action issued in Chinese Application No. 200880107013.1 on Sep. 28, 2011; 8 pages.
Office Action issued in Mexican Application No. MX/a/2010/002838 on Oct. 28, 2011; 2 pages.
Herzberg, Amir "Payments and Banking with Mobile Personal Devices", Communications of the ACM, May 2003; vol. 46, No. 5; pp. 53-58.
Notice of Allowance issued in U.S. Appl. No. 12/205,796 on Jul. 2, 2012; 10 pages.
Office Action issued in U.S. Appl. No. 12/205,807 on Jun. 7, 2012; 14 pages.
Office Action issued in U.S. Appl. No. 13/108,717 on May 1, 2012; 20 pages.
Office Action issued in U.S. Appl. No. 12/210,167 on Jul. 19, 2012; 15 pages.
Office Action issued in U.S. Appl. No. 13/481,690 on Jun. 26, 2012; 31 pages.
Office Action issued in U.S. Appl. No. 13/302,766 on May 29, 2012; 9 pages.
Examination report issued in Australian Application No. 2008298677 on Jun. 6, 2012; 2 pages.
Office Action issued in Chinese Application No. 200880107195.2 on May 29, 2012; 10 pages.
Office Action issued in Chinese Application No. 200880107187.8 on Apr. 28, 2012; 10 pages.
Office Action issued in Mexican Application No. MX/a/2010/002833 on Jul. 14, 2011; 2 pages.
Notice of Allowance issued in U.S. Appl. No. 13/367,022 on Oct. 24, 2012; 9 pages.
Office Action issued in U.S. Appl. No. 13/107,717 on Oct. 5, 2011; 18 pages.
Office Action issued in U.S. Appl. No. 13/108,717 on Sep. 6, 2012; 6 pages.
Office Action issued in U.S. Appl. No. 13/302,766 on Oct. 16, 2012; 10 pages.
Office Action issued in U.S. Appl. No. 13/306,588 on Sep. 19, 2012; 11 pages.
Examination report issued in Australian Application No. 2008298581 on Oct. 4, 2012; 3 pages.
Notice of Allowance issued in Chinese Application No. 200880107013.1 on Apr. 28, 2012; 4 pages.
Communication under Rule 71(3) issued in European Application No. 08830136.1 on Sep. 30, 2011; 67 pages.
U.S. Appl. No. 13/313,866 entitled "Executing Reader Application", inventor Jain, filed Dec. 7, 2011.

* cited by examiner

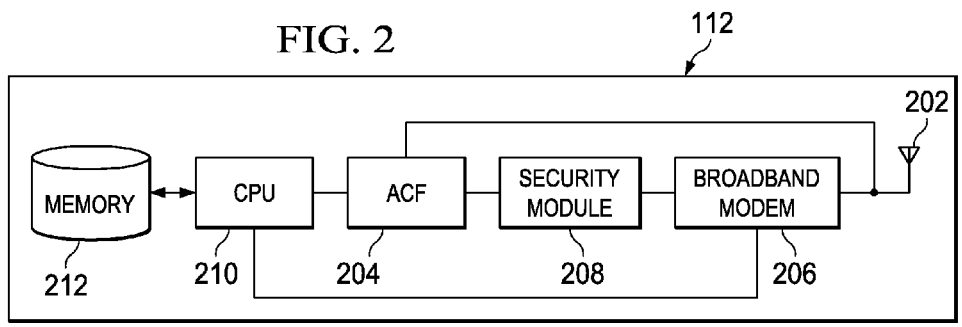
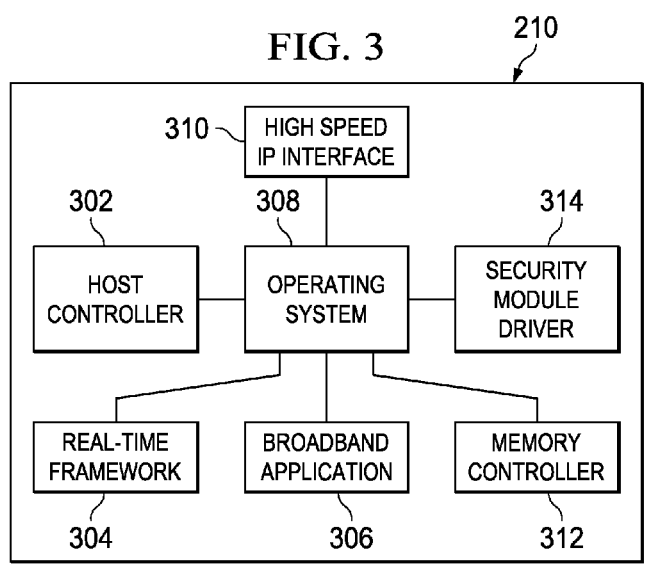
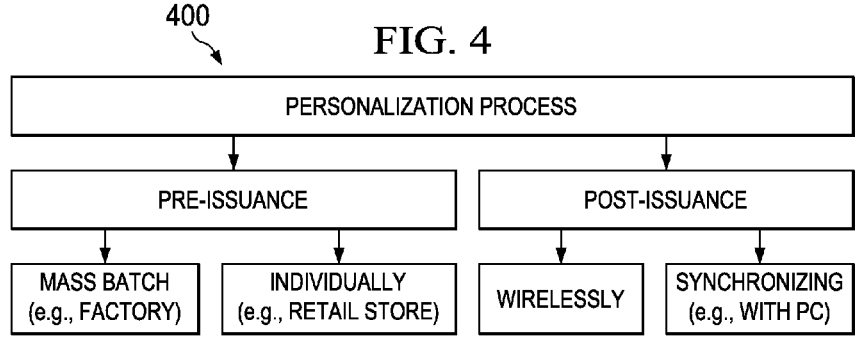

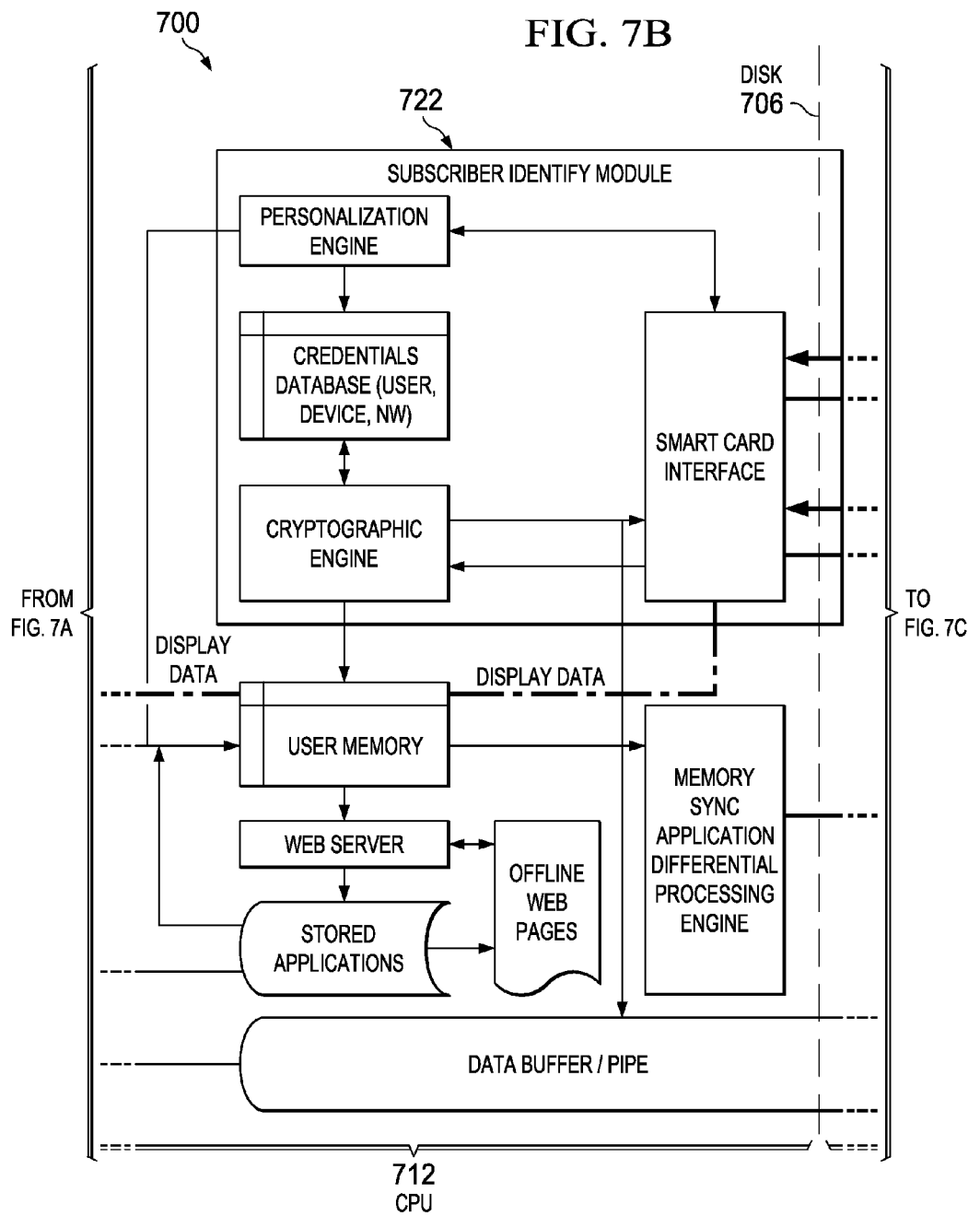

WIRELESSLY ACCESSING BROADBAND SERVICES USING INTELLIGENT CARDS

CLAIM OF PRIORITY

This application claims priority under 35 USC §119(e) to U.S. Patent Application Ser. No. 60/971,813, filed on Sep. 12, 2007, the entire contents of which are hereby incorporated by reference.

TECHNICAL FIELD

This invention relates to network communications and, more particularly, to wirelessly accessing broadband services using intelligent cards.

BACKGROUND

Portable electronic devices and tokens have become an integrated part of the regular day to day user experience. There is a wide variety of common portable and handheld devices that users have in their possession including communication, business and entertaining devices such as cell phones, music players, digital cameras, smart cards, memory token and variety of possible combinations of the aforementioned devices and tokens. All of these devices share the commonality that consumer are accustomed to carrying them with them most of the time and to most places. This is true across the various demographics and age groups regardless of the level of the sophistication of the consumer, their age group, their technical level or background.

These common handheld devices offer options for expandable memory. Micro Secure Digital (microSD) is the popular interface across high-end cellphones while SD and MultiMediaCard (MMC) interfaces are also available in limited models. MicroSD is the least common denominator supported by the majority of these devices and tokens (in terms of size). In addition, adaptors are available to convert a MicroSD into MiniSD, SD, MMC and USB Although most popular MP3 player (iPOD) offer's a proprietary interface, competing designs do offer standard interfaces. Digital cameras offer mostly SD and MMC while extreme Digital (xD) is another option. Micro and Mini versions of these interfaces are also available in several models. Mini-USB is increasingly available across cellphones, digital cameras and MP3 players for synchronization with laptops.

Various solutions exist for providing connectivity for PCs, mobile phones and PDAs to wide area wireless broadband networks. Unlike Wi-Fi, wide area wireless broadband networks use spectrum licensed by a service provider. In order to provide access, the broadband service providers charge an access fee. In the case of consumer devices such as mobile phones and PDAs, the hardware to access the broadband network is typically embedded into the device. In order to secure access and prevent multiple users from sharing the access provided in exchange for the fee, the service provider uses either specially designed software resident on the device that is accessing the network or a removable security token such as the SIM card.

In the case of the PC, these solutions comprise of a hardware modem that can be added to the PC using peripheral interfaces such as USB, PCMCIA, PCIA or mini-PCI (and others). To control access, either a connection manager software is provided by the service provider that authenticates a user using user-id and password and/or a more secure authentication software is used (such as X.509 certificates). This software is typically installed on the PC together with the access driver for the hardware. In some options, the default connection manager provided by the operating system of the PC (such as Windows XP/Vista/MacOS etc.) can be used. In this case, the user is asked to provide his user id and password.

There are other consumer devices such as cameras, camcorders, MP3 players, game players and portable vides players that may require broadband internet connection for useful applications. These devices have proprietary operating systems that cannot be expanded easily by installing device drivers. Furthermore, these devices may lack a user interface and keyboard for the user to provide a username and password for authentication. In addition, these devices also lack PCMCIA or USB type expansion slots where broadband modem hardware could be inserted. These devices also typically lack the slot for a hardware security token such as a SIM card in order to provide secure access to a fee based wireless broadband service provider. These devices also need memory for the users to store content captured through these devices. The need for such memory is growing at a rapid rate.

SUMMARY

The present disclosure is directed to a system and method for wirelessly accessing broadband services using intelligent cards. In some implementations, a broadband service card includes a physical interface, a communication module, secure memory, and service module. The physical interface connects to a port of a consumer host device. The communication module wirelessly receives RF signals from and transmits RF signals to a wireless broadband network. The secure memory stores user credentials used to securely authenticate the card and access a service foreign to the consumer host device through the wireless broadband network independent of the consumer host device. The user credentials are associated with a broadband service provider. The service module accesses the foreign service using the user credentials in response to at least an event and transmits a service request to the broadband service provider using the wireless broadband core network.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 2 is an example transaction card for accessing broadband services;

FIG. 3 is Central Processing Unit of FIG. 2 in accordance with some implementations of the present disclosure;

FIG. 4 is a schematic diagram illustrating personalization processes of intelligent cards;

FIGS. 7A, 7B and 7C are examples of call flow illustrating call sessions with an intelligent card;

Like reference symbols in the various drawings indicate like elements.

DETAILED DESCRIPTION

Figure 1:
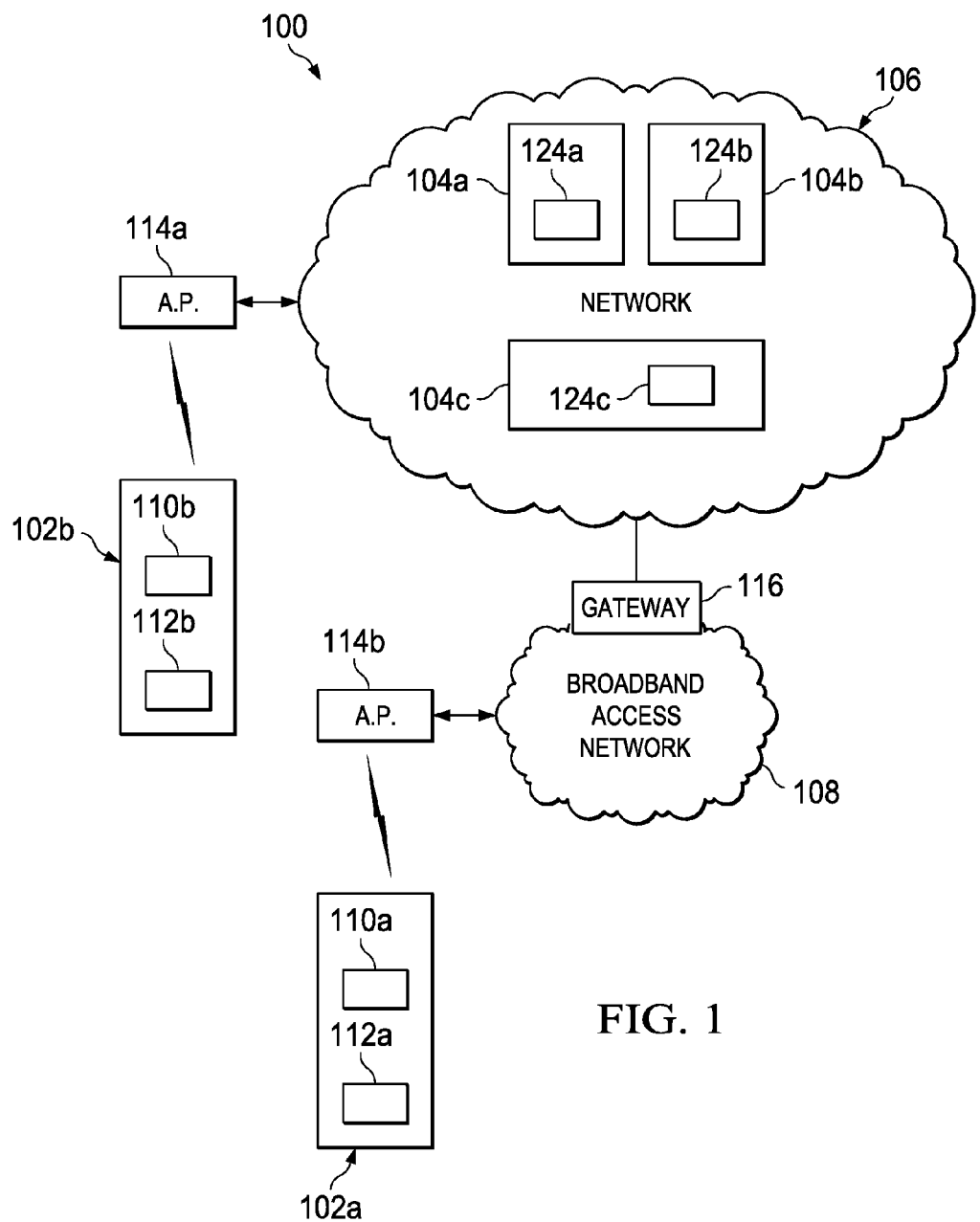
FIG. 1 is an example transaction system in accordance with some implementations of the present disclosure.

FIG. 1 is a block diagram illustrating an example service system 100 for providing foreign services to consumer devices using an intelligent card independent of consumer host device. For example, the system 100 may include a SecureDigital (SD) card that automatically connects and authenticates the user to a wireless broadband network independent of a consumer host device. Foreign, as used herein, means any component, object, value, variable, service and/or data and/or data schema that is not directly processable, accessible, or otherwise capable of communicating with the consumer devices 102. Aside from SD, the system 100 may include other interfaces that connect an intelligent card to the host device such as, for example, MultiMediaCard (MMC), microSD, miniSD, Universal Serial Bus (USB), Apple iDock, Firewire, and/or others. An intelligent card is a device configured to insert into or otherwise attach to a consumer host device and access or otherwise execute services (e.g., receive broadband internet connection, upload data to Internet, access streaming media content and others) independent of the consumer host device. In some implementations, the intelligent card may be shaped as a SD card miniSD card, microSD card including, for example, notches, raised portions and/or other features. The system 100 may modify, translate, or otherwise convert foreign communications to a signal processable by or otherwise native to the consumer device 102. In addition, the system 100 may include an intelligent card that includes a dual interface. The dual interface may connect the intelligent card to both the host device through a physical interface (e.g., SD, MMC, USB) and external devices using broadband technology. In some implementations, broadband technology may include General Packet Radio Service (GPRS), High-Speed Downlink Packet Access (HSDPA), High Speed Packet Access (HSPA), Evolution-Data Optimized (EV-DO), EVolution Data/Voice (EV-DV), Ultra Mobile Broadband (UMB), Worldwide Interoperability for Microwave Access (WiMAX), Long Term Evolution (LTE), other 802.1x based access networks and other IP based wireless broadband networks, and/or any other broadband technology. For example, the system 100 may convert communications between a wireless broadband signal and a signal compatible or otherwise native to the consumer device 102 (e.g., between a WiMAX and SD signal). In internet-working the communication protocols, the system 200 may provides foreign services to the consumer device 102. In some implementations, the conversion of the foreign services to compatible forms may be transparent to the user of the consumer device 102. Foreign services may include accessing network services using Worldwide Interoperability for Microwave Access (WiMax), Third Generation Partnership Project Long Term Evolution (3GPP LTE), High Speed Packet Access (HSPA), Ultra Mobile Broadband (UMB), and/or other broadband services at least partially incompatible with the consumer device 102. The intelligent card in the system 100 may execute one or more of the following: selectively activate an antenna for wireless services in response to at least an event; authenticating with a service provider through a base station offering connectivity to, for example, a wireless broadband network; access services of the wireless broadband service provider independent of the consumer host device; and/or other processes. By providing an intelligent card, the system 100 may securely authenticate to and wirelessly access foreign services without either requiring additional hardware, software, and/or firmware on the consumer host device.

At a high level, the system 100 includes the consumer devices 102a and 102b and the service provider 104 communicably coupled through a core network 106 and/or a broadband access network. The consumer device 102 includes a GUI 110 for providing an interface to the foreign services and a service card 112 for independently converting the foreign services to forms compatible with the consumer device 102. n some implementations, the service card 112 may selectively switch antenna on and off in response to an event such as a selection of a graphical element using the GUI 110. In some implementations, the service card 112 may transmit a request for services to, for example, the access point 114. The core network 106 and the broadband access network 108 includes access points 114, for example base stations, for wirelessly communicating services to the service cards 112.

Each consumer device 102 comprises an electronic device operable to interface with the service card 112a. For example, the consumer device 102 may receive and transmit wireless and/or wireless communication with the system 100. As used in this disclosure, the consumer devices 102 are intended to encompass digital cameras, MP3 players, camcorders, PCs, UMPCs, game players, portable media players, cellular phones, data phones, pagers, portable computers, SIP phones, smart phones, personal data assistants (PDAs), one or more processors within these or other devices, or any other suitable processing devices capable of communicating information with the service card 112. In some implementations, the consumer devices 102 may be based on a cellular technology. In some implementations, the consumer device 102 may comprise a digital camera that includes an input device, such as a touch screen or other device that can accept information, and an output device that conveys information associated with a transaction with the service provider 104, including digital data, visual information, or GUI 110.

The GUI 110 comprises a graphical user interface operable to allow the user of the consumer device 102 to interface with at least a portion of the system 100 for any suitable purpose, such as editing configuration and other settings. Generally, the GUI 110 provides the particular user with an efficient and user-friendly presentation of data provided by or communicated within the system 100 and/or also an efficient and user-friendly means for the user to self-manage settings and access services offered by the service provider 104. The GUI 110 may comprise a plurality of customizable frames or views having interactive fields, pull-down lists, and/or buttons operated by the user. The term graphical user interface may be used in the singular or in the plural to describe one or more graphical user interfaces and each of the displays of a particular graphical user interface. The GUI 110 can include any graphical user interface, such as a generic web browser or touch screen, that processes information in the system 100 and presents the results to the user.

The service card 112 can include any software, hardware, and/or firmware configured to wirelessly access foreign services through the access point 114b and/or the access point 114. For example, the service card 112 may independently access one or more services from the service provider 104 and translate, map or otherwise convert the accessed services to forms compatible with the consumer device 102. In some implementations, the service card 112 can provide the services through the GUI 110 such as streaming video. In wirelessly accessing services, the service card 112 may communicate wide-range, short-range and/or other signals. Wide range signals may include WiMax, 3GPP LTE, HSPA, UMB, and/or other broadband signals. Short range signals may include WiFi, Zigbee, UWB and/or other signals. In some implementations, the service card 112 may include one or more chipsets that execute an operating system and security processes to access foreign services independent of the consumer host device 102. In doing so, the consumer device 102 may not require additional hardware, software, and/or firmware to wirelessly access a foreign service such as uploading contents of memory to the Internet, accessing streaming video, and/or other services. In some implementations, the service card 112 may execute one or more of the following: wirelessly transmit a request for services to the access point 114 and/or access point 114b in response to at least an event; transmit authorization for accessing the requested service (e.g., security information); translate between wireless protocols (e.g., wireless broadband protocols) and protocols compatible with the service card 112; translate between service-card protocols and protocols compatible with consumer device 102; present and receive information (e.g., content request) from the user through the GUI 110; decrypt and encrypt information wirelessly transmitted between the service card 112 and the access point 114 and/or access point 114b; execute applications locally stored in the service card 112; selectively switch the antenna on and off based, at least in part, on one or more events; authenticate user based, at least in part, on information locally stored in the service card 112; authentication processes based, at least in part, on information received, for example, through the GUI 110; transmit a host signature to, for example, wireless broadband network 108 in response to at least an authentication challenge; and/or others. In some implementations, the service card 112 may access a service in response to at least a user selecting a graphical element in the GUI 110. In some implementations, the service card 112 may selectively switch the antenna between an on and off state in response to one or more events (e.g., user request, completion of broadcast). The service card 112 may include a communication module with a protocol translation module, antenna tuning circuit, power circuit and an antenna tuned to exchange wireless data with the networks 106 and/or 108.

In some implementations, the service card 112 may initiate access to services in response to at least a user selecting a graphical element in the GUI 110. In some implementations, the service card 112 may selectively switch the antenna between an on and off state in response to one or more events. The one or more events may include a user request, completion of service access, insertion of card 112 in a different consumer device, location change, timer events, detection of incorrect authentication information entered by the user, change of wireless network that the card 112 is connected to, message received from the service provider 104 using wireless communication methods such as SMS, and/or other events. For example, the service card 112 may receive one or more commands to switch the antenna off from the wireless broadband network 108. In some implementations, the service card 112 may request user identification such as a PIN, a user ID and password combination, biometric signature, and/or others.

In regards to translating between protocols, the service card 112 may process information in, for example, ISO 7816, a standard security protocol, and/or others. In this case, the service card 112 may translate between a wireless broadband protocol and the service-card protocol. In some implementations, ISO 7816 commands may be encapsulated within interface commands used to transmit data between the consumer host device 102 and the card 112. In addition, the service card 112 may interface the consumer device 102 through a physical interface such as MicroSD, Mini-SD SD, MMC, miniMMC, microMMC, USB, miniUSB, microUSB, firewire, Apple iDock, and/or others. In regard to security processes, the service card 112 may implement one or more encryption algorithms to secure information such as a subscriber Identifier (ID) (e.g., subscriber account number), PIN, and/or other security related information. The security related information may include a subscription date, authentication code, user name, password, APN, gateway IP address, X.509 certificates, and/or other user information associated with authenticating an identity of the card holder. In some implementations, the service card 112 may execute private key (symmetric algorithms) such as Data Encryption Standard (DES), Triple DES (TDES), public key (asymmetric algorithms) such as RSA, elliptic curves, access algorithms such as EAP (along with its various flavors like EAP-SIM, EAK-AKA etc), Millenage, COMP 128, and/or others. For example, the service card 112 may include one or more encryption keys such as public-private keys. In addition, the service card 112 may include memory (e.g., Flash, EEPROM) including a secured token accessible by the service providers 104 to store access rights of the user. The service card 112 may also store user data, applications, offline Webpages, and/or other information. For example, the service card 112 may include a secure token that identifies content that the user subscribes to or can otherwise access. In addition, the service card 112 may execute or otherwise include digital rights management technology to substantially prevent illegal copying, storing or distributing or other violations of digital rights.

In regards to applications, the service card 112 may execute a locally stored application and present information to and received information from the user through the GUI 110. For example, the service card 112 may execute an application used to automatically upload information stored in the consumer device 102 and/or in the memory of the service card 112 in response to at least a user selecting a graphical element presented in the GUI 110. Alternatively or in addition to applications, the service card 112 may present content (e.g., audio, video) to the user using the GUI 110. In response to initiating foreign-service access, the service card 112 may automatically present an offline Web page through the GUI 110. In some implementations, the offline Web page can be associated with a service provider 104. In some implementations, the service card 112 can be backward compatible and operate as a mass storage device. For example, if the wireless interface of the service card 112 is not available or deactivated, the service card 112 may operate as a mass storage device enabling users to access data stored in the memory component (e.g., Flash). In some implementations, the service card 112 can execute a set of initialization commands in response to at least insertion into the consumer device 102. These initialization commands may include determining device related information for the consumer device 102 (e.g., device ID, device capabilities), determining user relating information (e.g., PIN code, activation code), incrementing counters, setting flags and activating/deactivating functions according to pre-existing rules and/or algorithms.

In some implementations, the service card 112 may automatically execute one or more fraud control processes. For example, the service card 112 may identify an operational change and automatically transmit a notification to the service provider 104 based, at least in part, on the identified change. The service card 112 may execute two fraud control processes: (1) determine a violation of one or more rules; and (2) automatically execute one or more actions in response to at least the violation. In regards to rules, the service card 112 may locally store rules associated with updates to operational aspects of the service card 112. For example, the service card 112 may store a rule indicating a change in consumer host device 102 is an operational violation. In some implementations, the service card 112 may store rules based, at least in part, on updates to one or more of the following: device ID; network APN, gateway IP address, location, 802.1x beacons; and/or other aspects. In response to one or more events matching or otherwise violating rules, the service card 112 may execute one or more processes to substantially prevent or otherwise notify the service provider 104 of potentially unauthorized activity. For example, the service card 112 may execute a command to block an associated user account and/ or the service card 112. In some implementations, the service card 112 may execute a command based, at least in part, on an event type. In some examples, the service card 112 may transmit a message to the service provider 104 in response to at least a change in device ID. In some examples, the service card 112 may re-execute an activation process in response to at least a specified event type. An activation process may include activating the service card 112 and/or service account as discussed in more detail with respect to FIG. 6. In some implementations, the service card 112 may execute a command to disconnect the GUI 110 from the service card 112. The service card 112 may present a disconnection notification through the GUI 110 prior to executing the command. In some implementations, the service card 112 may transmit a command to the service provider 104 to deactivate an account associated with the card 112.

In regards to accessing broadband services, the interface between the service card 112 and the access point 212 may be WiMax, 4$^{th}$ generation wireless wide area network technologies or other interfaces. In this implementation, the service card 112 may be owned by the Wireless Wide Area Network Operator (WWANO) and personalized to enable the service card 112 access to the WWAN. The actual provisioning data may depend on the security framework of the WWANO and may include a Network identifier (SSID), a connection profile, security data (unique identifiers for the service card 112 with unique keys), WWANO selected authentication algorithm, and/or other aspects of the network 106. The service card 112 may include a temporary user account enabling restricted access to a landing page on the WWANO portal to perform, for example, a sign-up and activation process. Based on the directives defined by the service provider, the service card 112 may be provisioned to bind to the consumer device 102, the network 106, both, or none. For network operator distributed cards, the service card 112 may include antenna modes set to, for example, physical authentication only or physical and user authentication with additional network mutual authentication. For retailer distributed cards, the service card 112 may include antenna modes set to, for example, physical authentication only or physical and user authentication with open access to different WWAN networks. For OEM distributed cards, the service card 112 may include antenna modes set to, for example, physical and user authentication or physical, device and user authentication with open access to different WWAN networks. A user may acquire the WWAN service card 112 when subscribing to the WWANO's broadband data service. Activation of the service card 112 may depend on whether the device 102 includes an interface such as a screen and a keyboard and whether the device is in WWAN coverage. The service card 112 may be activated executing an online activation or offline activation process. Online activation may be executed when the device 102 includes an interface and is in WWAN coverage. Offline activation may be executed when the device 102 is either not in coverage or does not include an interface. In some implementations, the service card 112 may be activate based on the Table 1.

TABLE 1

| Online Activation | Offline Activation |
|---|---|
| When the device is in coverage and has a screen/keyboard, it is assumed capable of connecting to the internet provided a connection is available. In this case, when the card inserts, it performs a plug-in bootstrap and authentication process. Once completed, the plug-in proceeds to perform the network bootstrap and installation process. Once successful, the device may take the user to a landing page on a browser where the user can perform the registration process. | In this case, the user may cradle the host device to the PC that has an internet access and launch the included activation software. This software may take the user to the WWANO landing page to perform the registration process. |

The table is for illustration purposes only. The activation of the service card 112 may include some, all, or different aspects of the chart.

In event the network operator distributes the service card 112 to the user when subscribing to the WWANO's broadband data service, the service card 112 may be configured to perform automatic network bootstrap and request network mutual authentication. In order to perform network bootstrap, the service card 112 may execute a connection manager software. In some implementations, this software can be executed after the installation and the authentication process are complete. The connection manager software may instructs the WWAN modem of the service card 112 (not illustrated) to search for available networks using Network ID information stored in the secure element. If there are no Network IDs profiled in the secure element, the service card 112 may prompt the user to select from available networks using the GUI 110. Once a network is selected, the service card 112 may connect and request an IP address. In response to at least granting access, a browser may be launched through the GUI 110 to display a landing page. If the secure element stores the user's connectivity profile, the connection manager software may attempt to log the user-in to the WWAN network 106. If successful, the user may have access to the internet subject to the provisions of his connectivity profile. If access is restricted or if no user connectivity profile is available for the connected network, the user may be invited to sign up for internet services and provided service options. Once selected, the connectivity profile may be downloaded to the service card 112 for future use. In some implementations, the secure element of the service card 112 may implement the Extensible Authentication Protocol (EAP) protocol to perform network mutual authentication. Other algorithms may also be stored and implemented in order to authenticate the user for connectivity.

In some implementations, the user may access the connection manager software to execute one or more of the following: network access control to select alternate network if multiple options are available; host device control to manage host devices that the plug-in binds to in order to be operational; connectivity profile to configure and request additional services from the WWANO, manager service plan, renew access etc.; access control to control access to the plug-in if multiple family members or friends are using it with different host devices to log to the network; password wallet to store and manage multiple identities for accessing portals on the internet; and/or others. In some implementations, the WWAN service card 112 may share a same common platform as the service card 112 of FIG. 1. In this case, the CPU may operate the flash memory, secure element, the WWAN chipset, the antenna availability, and/or other aspects of the service card 112. The Flash memory may include different partitions such as a protected partition for the connection manager and other WWANO provided applications execute and a user memory. Because of the cryptographic capabilities of the secure element, the user may use encrypted memory where data is only accessible once a user PIN is provided. As previously mentioned, the service card 112 may connect to a SD to USB adaptor for PC or UMPC use.

In some implementations, the service card 112 may provide connectivity services to a small adhoc or nomadic network by functioning as a stand-alone box. In this mode, the service card 112 may connect to a cradle that consists of, for example, a switch, a router (wireless or wired) and a power adapter. The WAN interface may be provided by the service card 112 along with the connection manager capability. The user may be able to place this combined box in different coverage areas and connect different devices simultaneously to the WAN through this router. In some implementations, the WWANO may limit this functionality by either disabling it completely or providing this capability after user signs up for this additional value added capability specifically.

In the WWAN application, the service card 112 may include a secure element OS and a microcontroller OS. The secure element OS may enable network and Internet authentication algorithms based on EAP to be implemented. The secure element OS may structure data in the secure element to allow storage of connectivity profiles, user profiles, network profiles, password valets, host device signatures, allowed antenna modes, and/or other data. The microcontroller OS may be capable of personalizing the secure element by loading/updating connectivity, user and network profiles, and/or other data. In addition, the microcontroller OS may present the service card 112 as a SD Mass Storage to the consumer device 102. The microcontroller OS may partition the memory into a user section and a protected device application section. The device application section may be used to store provider specific applications that either operate from this segment of the memory or are installed on the consumer device 102 from this segment of the memory. In the protected area, the providers 104 may store other value added functions such as VPN clients, VOIP softphones and other applications that may provide valuable applications over the broadband wireless connection. In some implementations, the service card 112 may be used as an identity management token to provide solutions for common internet access risks such as identity theft, phishing, pharming, and/or other attacks. Since the service card 112 may include a tamper proof secure element, the service card 112 may guarantee service providers 104 on the internet that the holder of the service card 112 is an authentic user. Using applications complying industry standard identity management platforms such as Cardspace, Liberty Alliance, openID etc, the service card 112 may integrate into the WWANO's identity management framework.

Network 106 facilitates wireless or wired communication between the service providers 104 and any other local or remote computer. Network 106 may be all or a portion of an enterprise or secured network. While illustrated as single network, network 106 may be a continuous network logically divided into various sub-nets or virtual networks without departing from the scope of this disclosure, so long as at least a portion of network 106 may facilitate communications of transaction information between the service providers 104. In some implementations, network 106 encompasses any internal or external network, networks, sub-network, or combination thereof operable to facilitate communications between various computing components in system 100. Network 106 may communicate, for example, Internet Protocol (IP) packets, Frame Relay frames, Asynchronous Transfer Mode (ATM) cells, voice, video, data, and other suitable information between network addresses. Network 106 may include one or more local area networks (LANs), radio access networks (RANs), metropolitan area networks (MANs), wide area networks (WANs), all or a portion of the global computer network known as the Internet, and/or any other communication system or systems at one or more locations. In some implementations, the network 106 include the service providers 104a-c.

Service provider 104a-c comprises an electronic device (e.g., computing device) operable to provide one or more services to the service card 112. In some implementation, the service provider 104 can provide multimedia content to the service card 112. In some implementations, the service provider 104 may provide remote memory for the consumer host device 102 using the service card 112. The service provider 104 may transmit one or more of the following: serial programs (e.g., television series), movies, news, opinions, education content, training, sports events, Web pages; advanced blogging sites, travel-related content, food and/or cooking content; entertainment; topical movies and/or videos (e.g., surfing, sailing, racing, extreme sports, etc.); political content (e.g., campaigning); adult content; court and/or trail programming; local-government content (e.g., C-SPAN); local programming (e.g., Wayne's World); performing arts (e.g., theater, concerts, music videos, etc.); virtual shopping malls; and/or other content. The provided content may be in any suitable format such as MPEG, streaming and/or others. In the illustrated implementation, the service provider 104 includes an authentication module 124 for authenticating a user prior to providing access to services. For example, the authentication module 124 may transmit a request for information associated with the user such as subscriber ID, device ID, PIN, username and password, and/or other information. Based, at least in part, on information associated with the user information, the authentication module 124 may determine available services, content, level of services, and/or other aspects of the requested foreign service.

The broadband access network 108 facilitates communication between consumer devices 102 and the core network 106. In general, the broadband access network 108 communicates IP packets to transfer voice, video, data, and other suitable information between network addresses. In the case of multimedia sessions, the broadband access network 108 may uses Voice over IP (VOIP) protocols to set up, route, and tear down calls. The consumer devices 102 connect to broadband access network 108 through an access point 114b. In general, the broadband access network 108 may include one or more LANs and/or any other communication systems. Users may subscribe to the broadband access network 108, for example, to receive cable television services, DSL or modem internet access using 802.11, wireless microwave broadband internet access (WiMAX), fiber optic cable internet access (FTTC/H Ethernet), wireless personal access networking (WiFi/Bluetooth), digital mobile telephony access (GSM over IP, UMTS over IP) and/or others.

In some implementations, the service card 112 may operate in accordance with one or more of the following modes: active CPE (consumer premises equipment); active router; self train; killed; memory; inactive; and/or other modes. The service card 112 may operate in active CPE mode to present the service card 112 as a consumer premises equipment. In this mode, the service card 112 may authenticate, connect and execute applications access broadband services through the wireless broadband network 108. After the antenna of the service card 112 is activated in this mode, the wireless broadband network 108 may detect the presence of the service card 112. In this mode, the gateway 116 may perceive the service card 112 as a CPE and may communicate with the service card 112 accordingly. In these implementations when the card 112 operates in an active-CPE mode, the access point 114b can wirelessly communicate with the service card 112 using the same signals used to communicate with other compatible CPEs. In this implementation, the device 102 may not require additional software to access the services.

In the active-router mode, the service card 112 may convert the device 102 to a wireless router device capable of providing wireless broadband connectivity to other devices when in range of itself. In the event that another device 199 is proximate to device 102, the router mode of the service card 112 may offer connectivity to the device 199 to the services offered by the wireless broadband service provider This mode may only be suitable for devices 199 that have another service card 112 or another embedded capability to connect to the device 102 using peer to peer wireless protocols such as Bluetooth, UWB and Wi-Fi. Once the user authorizes the transmission, the service card 112 in this mode may provide DHCP based IP address to the device 199 and use protocols such as NAT to route IP traffic between the device 199 and the service provider. For example, the device 199 in this mode may receive the same services as the device 112 through the setup of an adhoc personal area network between the two devices.

In regards to the self-train mode, the service card 112 may allow automatic provisioning of the card. In some implementations, the self-train mode can be activated by a special action (e.g., a needle point press to a small switch, entry of an administrative password via the GUI 110). In response to at least activating this mode, the service card 112 may be configured to receive personalization data over, for example, the short range wireless interface from another peer service card. Personalization data received in this mode may include encrypted information that is stored in secured memory of the service card 112. In some implementations, the service card 112 in this mode may receive the information through a wireless interface of a transmitter and/or others. The service card 112 may then synthesize the information that corresponds to the user account and personalize an internal security module that includes, for example, service applications for accessing services from the provider 104 and associated user credentials. The self-train mode may be used to re-personalize the service card 112 in the field. In some implementations, all previous data can be deleted if the self-train mode is activated. The self-train mode may be a peer-to-peer personalization mode where the card 112 may receive personalization information from another service card 112. This mode may represent an additional personalization mode as compared with factory, store and/or Over-The-Air (OTA) personalization scenarios which may be server to client personalization scenarios. In some implementations, the self-train mode may be a peer-to-peer personalization mode where the service card 112 receives personalization information from another service card. Since two service cards 112 are used in this mode, this mode may be different from a server-to-client personalization scenario as with a factory, store, and OTA personalization.

In regards to the inactive mode, the service card 112 may temporarily deactivate the wireless interface. In some implementations, the inactive mode can be activated through the physical interface with the mobile device 102 such as a SD interface. In response to at least the activation of the inactive mode, the service card 112 may temporarily behave as only a mass-memory card. In some implementations, the card 112 may also enter this state when the reset needle point is pressed. In this mode, the service card 112 may preserve locally-stored information including user information. In this mode, the service card 112 may execute the activation process and if successful may return to the active mode. The service provider 104 may use this mode to temporarily prevent usage in response to at least identifying at least potentially fraudulent activity.

In regards to the killed mode, the service card 112 may permanently deactivate the wireless interface. In some implementations, the killed mode is activated through the physical interface with the mobile device 102 such as a SD interface. In response to at least the activation of the killed mode, the service card 112 may permanently behaves as a mass memory stick. In the event that the reset needle point is pressed, the service card 112 may, in some implementations, not be made to enter any other modes. In addition, the service card 112 may delete user information in memory in response to at least this mode being activated. In some implementations, the providers 104 may use this mode to delete data from a service card 112 that is physically lost but still connected to the cellular network 108.

In regards to the memory mode, the service card 112 may operate as a mass memory stick such that the memory is accessible through conventional methods. In some implementations, the service card 112 may automatically activate this mode in response to at least being removed from the host device, inserted into a non-authorized host device, and/or other events. The service card 112 may be switched to active mode from the memory mode by, for example, inserting the card 112 into an authorized device or may be switched from this mode into the self-train mode to re-personalize the device for a new host device or a new user account. In some implementations, the memory mode may operate substantially same as the inactive mode.

In some implementations, the service card 112 may be re-personalized/updated such as using software device management process and/or a hardware reset. For example, the user may want to re-personalize the service card 112 to change host devices, to have multiple host devices, and/or other reasons. In regards to the software device management, the user may need to cradle the new host device with the service card 112 inserted to launch the software device management application. In some implementations, the software management application can be an application directly installed on a client, integrated as a plug-in to a normal synchronization application such as ActiveSync, available via a browser plug-in running on the plug-in provider's website, and/or other sources. The user may log into the application and verify their identity, and in response to verification, the application may allow access to a devices section in the device management application. The device management application may read the service card 112 and display the MAC addresses, signatures of the devices that he has inserted his plug-in to, and/or other device specific information. The mobile device 102 may be marked as active and the host device may be shown as disallowed or inactive. The application may enable the user to update the status of the new host device, and in response to at least the selection, the device management application may install the signature on the new host device and mark update the status as allowable in secure memory of the service card 112. The user may be able to also update the status of the mobile device 102 to disallowed. Otherwise, both devices may be active and the service card 112 may be switched between the two devices. In regards to the hardware reset process, the use may use the reset needle point press on the physical service card 112 to activate the self-train mode. In this mode, the user data may be deleted and have to be reloaded. When the service card 112 is inserted into the new host device, the provisioning process may begin as discussed above.

In some aspects of operation, the service provider 104 may transmit information to the consumer host device 102 using the service card 112 in response to at least an event. The information may include, for example, service information (e.g., update memory contents of the service card), scripts, applications, Web pages, and/or other information associated with the service provider 104. The event may include completing access to a service, determining a service card 112 is outside the operating range of a wireless broadband network 108, receiving a request from a user of the consumer host device, and/or others. For example, the service provider 104 may identify a consumer host device 102 associated with a card 112 that accessed a service and transmit service information to the service card 112 using the wireless broadband core network 108. In addition or alternatively, the service provider 104 may request information from the consumer host device 102, the service card 112 and/or the user using the wireless broadband core network 108. For example, the service provider 104 may transmit a request for access history to the card 112 through the wireless broadband core network 108.

FIG. 2 is a block diagram illustrating an example service card 112 in accordance with some implementations of the present disclosure. In general, the service card 112 may independently access foreign services using, for example, wireless broadband technology. The service card 112 is for illustration purposes only and may include some, all, or different elements without departing from the scope of the disclosure.

As illustrated, the service card 112 includes an antenna 202, an Antenna Control Function (ACF) module 204, a broadband modem 206, a security module 208, a CPU 210 and memory 212. The antenna 202 wirelessly transmits and receives signals such as wireless broadband radio signals (e.g., GPRS, 802.1x, EV-Dx, LTE, UMB). In some implementations, the AFC module 204 can selectively switch the antenna 202 between an active state and an inactive state in response to at least an event. A switching event may include a user selection through the GUI 110. In some implementations, the switching event may be based, at least in part, on operational aspects of the consumer device 102 such as memory exceeding a predefined threshold. In addition, the ACF module 204 may dynamically adjust the impedance of the antenna 202 to tune the transmit and/or receive frequency. The ACF module 204 may selectively switch the antenna 202 on and off in response to at least a command from the CPU 210. In some implementations, the antenna 202 can be a wide range wireless antenna connected to a wireless broadband chipset via a software switch such as an NAND Gate or other element to allow for code from the CPU 210 to turn the antenna 202 on and off through the ACF module 204.

The broadband modem 206 can include any software, hardware, and/or firmware configured to wirelessly receive and/or transmit signals using the antenna 202. For example, the broadband modem 206 may convert between wireless broadband signals and device interface signals. In some implementations, the broadband modem 206 may translate between a wireless protocol and an interface protocol. For example, the broadband modem 206 may translate between for example, a USB, an interface protocol, and/or others and a wireless broadband protocol (e.g., 802.1x, LTE). In some implementations, ISO 7816 commands may be encapsulated within interface commands used to transmit data between the consumer host device 102 and the card 112. In some implementations, the broadband modem 206 may include a broadband chipset, A/D conversion circuitry, RFIC circuit and/or a connection to the antenna 202.

The security module 208 can include any software, hardware, and/or firmware configured to execute one or more security processes. For example, the security module 208 may authenticate the service card 112 with the service provider 104 through, for example, the wireless broadband core network 108. Prior to authenticating the card 112 with the provider 104, the security module 208 may authenticate one or more aspects of the consumer host device, user, and/or network. In some implementations, the security module 208 may authenticate a user by verifying a physical connection with a user using user information such as biometric information (e.g., fingerprint), a PIN entered by the user, a x.509 type certificate that is unique to the user and stored on the host device, and/or other processes. For example, the security module 208 may compare user information provided through the GUI 110 with user information stored in the local memory 212. Alternatively or in addition, the security module 208 may authenticate the consumer host device 102 by comparing a device signature with a locally-stored certificate. In some implementations, the user can select a PIN or certificate at provisioning time. If this case, the CPU 210 may instantiate a software plug-in on the host device. For example, a software plug-in may request the user for his PIN in real time, read a user certificate installed on the device (e.g., x.509), and/or others. The operation of the software plug-in may be customized by the provider. Regardless, the returned user data may be compared with user data stored in the memory 212. In case of a successful user authentication, the ACF module 204 may activate the antenna 202. In case of an unsuccessful authentication of a certificate and/or user information, the card 112 remains inactive. In case of unsuccessful PIN match, the user may be requested to repeat PIN attempts until a successful match or the number of attempts exceeds a threshold. The card provider may customize the attempt threshold.

In regards to network authentication, the security module 208 may request network authentication prior to activation. For example, the security module 208 may be distributed by a Wireless Network Operator (WNO) that requires a network authentication. In this example, a flag in memory may be set to ON indicating that network authentication is required. If the flag is set to ON, the security module 208 may temporarily activate the antenna 202 using the ACF module 204. A unique identity about the allowed network may be locally stored in memory such a Service Set IDentifier (SSID), APN ID, gateway ID, DNS addresses for broadband networks, and/or identifiers. If this flag is ON, the security module 208 may transmit requests for network details to, for example, al available wireless networks in range. In some cases, the type of unique network identity employed and the method to deduce it from the host device may be variable and dependent on the network provider and capability of the host device. If the locally-stored ID matches the ID of any available wireless network, the security module may begin an online authentication process by negotiating subscription rights with the servicing access point. In this case, the user's subscription parameters such as subscription ID, user profile, security keys, username and password may be sent to the provider using the wireless broadband network. When the user is successfully authenticated, the service card may receive access and may be assigned an IP address to connect to the wireless broadband network. In this case, the antenna may remain active to enable access to foreign services. If the online authentication fails, the antenna may be turned off and access to remote services may be denied. The security module 208 may include a security module OS provided by the security module vendor and may be compliant with service-provider specifications. The security module OS may structure the data in the security module 208 to be compliant with provider specifications or any other available specifications. In addition, the security module 208 may store user subscription parameters, host device signatures, service networks information and allow modes of the antenna 202.

In some implementations, the security module 208 may implement one or more encryption algorithms to secure information such as a subscriber Identifier (ID) (e.g., subscriber account number), PIN, and/or other security related information and may execute online authentication to the servicing network. The security related information may include a subscription date, authentication code, user name, user ID, password, subscription ID, user profile and/or other user information associated with authenticating the identity and/or privileges of the card holder. In some implementations, the service card 112 may execute private key (symmetric algorithms) such as Data Encryption Standard (DES), Triple DES (TDES) and/or others or public key (asymmetric algorithms) such as RSA, elliptic curves, broadband authentication algorithms such as EAP, Milenage and/or others. For example, the service card 112 may include one or more encryption keys such as public-private keys. In some implementations, the security module 208 may include or otherwise operate as a Subscriber Identity Module (SIM) card. In this case, the SIM card may encrypt and decrypt data transmissions and store data about a specific user so that the user can be identified and authenticated to wireless broadband core network 108. In some embodiments, the SIM card may execute a Universal Subscriber Identity Module (USIM). In general, the SIM card may securely store the key identifying a mobile phone service subscriber, as well as subscription information, preferences, text messages and/or other information. In addition to storing authentication information, the SIM card may store network state information such as the location area identity (LAI). In short, the SIM card may contain the authentication key to access subscriber services in the wireless broadband core network 108. In some implementations, rather than a SIM, the security module may process authorization information using a EAP for accessing the access point 114b, a removable user-identity module (R-UIM) for accessing EV-DV networks, or any other secure storage device capable of communicating subscriber information to wireless broadband core network 108. During the authentication transaction process, the security module 208 may perform encryption algorithms for sharing authentication information with the gateway 116. While illustrated as separate elements, the security module 208 and the broadband modem 206 may be a single element. In this example, the broadband modem 206 and the security module 208 may execute one or more of the following: format signals for wireless communication in accordance with one or more formats; decrypt received messages and encrypt transmitted messages; authenticate user credentials locally stored in the memory 212 with the security network; acquire an IP address for connectivity from the servicing access point, execute DHCP services for other local devices; execute peer to peer connection with other local device; implement NAT to route traffic between the servicing network and other local devices; and/or other processes.

The CPU 210 can include any software, hardware, and/or firmware that manages operational aspects of the card 112 independent of the consumer host device 102. For example, the CPU 210 may include a runtime environment for executing broadband applications for accessing foreign services using broadband signals. In some implementations, the CPU 210 may execute one or more of the following: interfacing the consumer host device 102 such as translating between protocols; determining operational aspects of the consumer host device 102; transmitting commands to the consumer host device 102 to substantially control one or more hardware components (e.g., GUI 110, memory); identifying events associated with activating and deactivating the antenna 202; executing broadband applications that accesses foreign services from the provider 104; retrieve data from the host device; provide data to the host device; and/or others. In some implementations, the CPU 210 may transmit to the ACF module 204 switching commands in response to an event such as a user request, completion of a transaction, and/or others. In some implementations, the CPU 210 may switch the antenna 202 between active and inactivate mode using the ACF module 204 based, at least in part, on a personalization parameter defined by, for example, a user, distributor (e.g., service provider), and/or others. For example, the CPU 210 may activate the antenna 202 when the service card 112 is physically connected to a host device and when a handshake with the host device is successfully executed. In some implementations, the CPU 210 may automatically deactivate the antenna 202 when the service card 112 is removed from the host device. In some implementations, the antenna 202 is always active such that the service card 112 may be used as a stand-alone access device (e.g., device on a keychain). In regards to the handshaking process, the CPU 210 may execute one or more authentication processes prior to activating the service card 112 and/or antenna 202 as illustrated in FIG. 7. For example, the CPU 210 may execute a physical authentication, a device authentication, a network authentication, and/or a user authentication. For example, the CPU 210 may activate the antenna 202 in response to at least detecting a connection to the physical interface with the host device (e.g., SD interface) and successful installation of the device driver for mass memory access (e.g., SD device driver) on the host device. In some implementations, device authentication may include physical authentication in addition to a signature comparison of a device signature stored in memory 212 that was created during first-use (provisioning) to a run-time signature calculated using, for example, a unique parameter of the host device 102. In the event no host device signature exists in the memory 212, the CPU 210 may bind with the first compatible host device 102 that the card 112 is inserted into. A compatible host device 102 may be a device that can successfully accomplish physical authentication successfully. If a host-device signature is present in the memory 212, the CPU 210 may compare the stored signature with the real-time signature of the current host device 102. If the signatures match, the CPU 210 may proceed to complete the bootstrap operation. If the signatures do not match, host device 102 may be rejected, bootstrap is aborted and the card 112 may be returned to the mode it was before being inserted into the device.

The memory 212 may include a secure and non-secured section. In this implementation, the secure memory 212 may store one or more user credentials that are not accessible by the user. In addition, the memory 212 may store offline Web pages, applications, service history, and/or other data. In some implementations, the memory 212 may include Flash memory from 64 MB to 32 GB. In addition, the memory 212 may be partitioned into user memory and device application memory. The memory 212 may store signatures of allowed host devices and/or antenna modes. In some implementations, the memory 212 may include secure portions designed to be accessible only by the service provider.

FIG. 3 illustrates is a block diagram illustrating an example CPU 210 of FIG. 2 in accordance with some implementations of the present disclosure. In general, the CPU 210 includes personalized modules that access foreign services independent of the consumer device 102. The illustrated CPU 210 is for example purposes only, and the CPU 210 may include some, all or different modules without departing from the scope of this disclosure.

In some implementations, the service card 112 can include a host controller 302, a real-time framework 304, a broadband application 306, a real-time OS 308, a high speed IP interface 310, a memory controller 312, and a security-module driver 314. In some implementations, the host controller 302 includes an interface layer, an API/UI layer, a Web server, and/or other elements associated with the consumer host device 102. The host controller 302 includes an interface to the host device, i.e., physical connection. In regards to the physical interface, the host controller 302 may physically interface the consumer device 102 using an SD protocol such as MicroSD, Mini-SD or SD (full-size). In some implementations, the physical interface may include a converter/adapter to convert between two different protocols based, at least in part, on the consumer device 102. In some implementations, the consumer device 102 may communicate using protocols such as USB, MMC, Firewire, iPhone proprietary interface, and/or others. In addition, the host controller 302 can include any software, hardware, and/or firmware that operates as an API between the consumer device 102 and the service card 112. Prior to accessing services, the service card 112 may automatically install drivers in the consumer device 102 in response to at least insertion. For example, the service card 112 may automatically install a SD device driver in the device 102 to enable the service card 112 to interface the consumer device 102. In some implementations, the service card 112 may install an enhanced device driver such as a Mass Memory with Radio (MMR) API. In this implementation, the interface can drive a class of plug-ins that contain mass memory as well as a radio interface. The MMR API may execute one or more of the following: connect/disconnect to/from the MMR controller (Microcontroller in the plug-in); transfer data using MM protocol (e.g., SD, MMC, XD, USB, Firewire); send encrypted data to the MMR controller; receive Acknowledgement of Success or Error; received status word indicating description of error; turn radio on/off; send instruction to the service card 112 to turn the antenna on with specifying the mode of operation (e.g., sending mode, listening mode); transmit data such as send instruction to controller to transmit data via the radio; listen for data such as send instruction to controller to listen for data; read data such as send instruction to controller to send the data received by the listening radio; and/or others. In some implementations, MMR can be compliant with TCP/IP. In some implementations, API encapsulated ISO 7816 commands may be processed by the security module in addition to other commands.

In some implementations, host controller 302 can operate in accordance with the two processes: (1) the service card 112 as the master and the consumer device 102 as the slave; and (2) the card UT as the master. In the first process, the host controller 302 may pass one or more commands to the consumer device 102 in response to, for example, insertion of the service card 112 into a slot in the consumer device 102, a request from the GUI 110, and/or other events. In some implementations, the host controller 302 can request the consumer device 102 to execute one or more of following functions: Get User Input; Get Signature; Display Data; Send Data; Receive Data; and/or others. The Get User Input command may present a request through the GUI 110 for data from the user. In some implementations, the Get User Input may present a request for multiple data inputs. The data inputs may be any suitable format such as numeric, alphanumeric, and/or other strings of characters. The Get Signature command may request the consumer device 102 to return identification data such as, for example, a phone number, a device ID like an IMEI code or a MAC address, a network code, a subscription ID like the SIM card number, a connection status, location information, Wi-Fi beacons, GPS data, and/or other device specific information. The Display Data command may present a dialog to the user through the GUI 10. In some implementations, the dialog can disappear after a period of time, a user selection, and/or other event. The Send Data command may request the consumer device 102 to transmit packet data using its own connection to the external world (e.g., SMS, wireless broadband, Wi-Fi). The Receive Data command may request the consumer device 102 to open a connection channel with certain parameters and identify data received through the connection. In some implementations, the command can request the consumer device 102 to forward any data (e.g., SMS) satisfying certain criteria to be forwarded to the service card 112.

In regards to the UT as master, the host controller 302 may execute one or more of the following commands: security module Command/Response; Activate/Deactivate; Flash Memory Read/Write; Send Data with or without encryption; Receive Data with or without decryption; URL Get Data/ URL Post Data; and/or others. The security module commands may relate to security functions provided by the card and are directed towards the security module within the service card 112 (e.g., standard ISO 7816 command, proprietary commands). In some implementations, the commands may include encryption, authentication, provisioning of data, creation of security domains, update of security domain, update of user credentials after verification of key, and/or others. In some implementations, the commands may include non security related smart card commands such as, for example, read service history commands. The read service history command may perform a read of the memory 212 of the service card 112. In some implementations, certain flags or areas of the memory 212 may be written to after security verification. The Activate/Deactivate command may activate or deactivate certain functions of the service card 112. The Flash Memory Read/Write command may execute a read/write operation on a specified area of the memory 212. The Send Data with or without encryption command may instruct the service card 112 to transmit data using its wireless connection with, for example, the access point 114*b*. In addition, the data may be encrypted by the service card 112 prior to transmission using, for example, keys and encryption capability stored within the security module 208. The Receive Data with or without decryption command may instruct the service card 112 to switch to listening mode to receive data from its wireless connection with the wireless broadband core network 108. In some implementations, data decryption can be requested by the security module using, for example, keys and decryption algorithms available on the security module, i.e., on-board decryption. The URL Get Data/URL Post Data command may instruct the host controller 302 to return pages as per offline get or post instructions using, for example, offline URLs.

In some implementations, the host controller 302 may assign or otherwise associate URL style addressing to certain files stored in the memory 212 (e.g., flash) of the service card 112. In some implementations, the host controller 302 can locate a file using the URL and returns the file to the GUI 110 using standard HTTP, HTTPS style transfer. In some implementations, the definition of the files can be formatted using standard HTML, XHTML, WML and/or XML style languages. The file may include links that point to additional offline storage locations in the memory 212 and/or Internet sites that the card 112 may access. In some implementations, the host controller 302 may support security protocols such as SSL. The host controller 302 may transfer an application in memory 212 to the consumer device 102 for installation and execution. The host controller 302 may request the capabilities of the browser on the device 102 using, for example, the browser user agent profile, in order to customize the offline Web page according to the supported capabilities of the device and the browser, such as, for example, supported markup language, screen size, resolution, colors and such.

As part of the Real time OS, the real-time framework 304 may execute one or more functions based, at least in part, on one or more periods of time. For example, the real-time framework 304 may enable an internal clock available on the CPU 210 to provide timestamps in response to at least requested events. The real-time framework 304 may allow certain tasks to be pre-scheduled such that the tasks are executed in response to at least certain time and/or event based triggers. In some implementations, the real-time framework 304 may allow the CPU 210 to insert delays in certain transactions. In some implementation, a part of WAP standards called WTAI (Wireless Telephoney Application Interface) can be implemented to allow offline browser pages on the card 112 to make use of functions offered by the consumer device 102.

The broadband application 306 can include any software, hardware, and/or firmware that access broadband services. For example, the broadband application 306 may generate a request to access broadband services by selecting, extracting or otherwise including user credentials. In some implementations, the high speed IP interface 310 may execute one or more of the following: transmit properties of the service card 112 in response to at least an identification request received from the access point 114 and/or the access point 114b; receive a request to authenticate the card 112 from, for example, the access point 114b; identify user credentials in the memory 212 in response to at least the request; generate an access response based, at least in part, on the user credentials; transmit the access response to the access point 114b and/or access point 114 using, for example, a high speed IP interface 310; receive clear data, for example a random number, from the access point 114b and/or access point 114 and provide a response containing encrypted data by encrypting the clear data using the cryptographic capabilities of the security module 208; transmit the encrypted data using the high speed IP interface 310; increment an access counter with every access request received; transmit a value of the access counter in response to a request from the access point 114b and/or access point 114; execute differential calculation of the contents of the mass memory from the moment of previous similar calculation; and/or other processes. In generating the authentication response, the broadband application 306 may generate the response in a format specified by the wireless broadband network 108. The authentication request may include one or more of the following: user credentials; subscription ID, user profile, user certificate; username and password; and/or other card or user information. In some implementations, the broadband application 306 can automatically transmit information stored in the mobile user device 102 such as images, video, documents, and/or other information. In these cases, the broadband application 306 may effectively augment the memory of the consumer device 102 with remote memory in the service provider 104. In some implementations, the broadband application 306 may access content stored by the service provider 104 and present the media through the GUI 110 of the consumer host device 102. In these case, the broadband application 306 may present media through the GUI 110 that is otherwise not accessible by the consumer host device 102. The broadband application 306 may include a VOIP softphone, a Media Player capable of playing streaming video, and/or others.

The real-time OS 308 may execute or otherwise include one or more of the following: real-time framework 304; a host process that implements the physical interface between the transaction-card CPU and the consumer device 102; an interface that implements the physical interface between the transaction-card CPU and the security module; a memory-management process that implements the ISO 7816 physical interface between the transaction-card CPU and the security module; an application-layer process that implements the API and UT capabilities; the ACF module 204; power management; and/or others. In some implementations, the real-time OS 308 may manage the physical interface between the transaction-card CPU and the memory 212 that includes memory segmentation to allow certain memory areas to be restricted access and/or data buffers/pipes. In some implementations, the CPU 210 may include a separate memory controller 312 for managing the local memory 212. In some implementations, the real-time OS 308 may include a microcontroller OS configured to personalizing the security module 208 such as by, for example, converting raw data (subscription ID, user ID, password, user certification, DRM certificates, user profiles) into secure encrypted information. In addition, the microcontroller OS may present the card 112 as a SD mass storage to the host device 102. The microcontroller OS may partition the memory 212 into a user section and a protected device application section. In this example, the device application section may be used to store provider specific applications that either operate from this segment of the memory or are installed on the host device 102 from this segment of the memory.

The broadband chipset 318 may provide the hardware protocol implementation and/or drivers for RF communication such as wireless broadband communication. For example, the broadband chipset 318 may include on-board wireless broadband circuitry to interface with the access point 114b using a wireless/wireless connection. The wireless connection may be, for example, client to node (access point/gateway/base station), peer to peer (another service card 112 ) or node to client (router to other devices).

FIG. 4 is a schematic diagram 400 of personalization of a intelligent card (e.g., the service card 112, the service card 112 ). In particular, the intelligent card may be personalized prior to being issued to a user, i.e., pre-issuance, or after being issued to a user, i.e., post-issuance. In regards to pre-issuance, intelligent cards may be personalized in mass batches at, for example, a factory. In this example, each intelligent card may be loaded with user credentials, security framework, applications, offline Web pages, and/or other data. In some implementations, a intelligent card may be personalized individually at, for example, a service branch. In this case, a intelligent card may be individually loaded with data associated with a user after, for example, purchasing the card. As for post issuance, the intelligent card may be personalized wirelessly. For example, the service card 112 may be personalized through a wireless broadband connection established using the consumer device 102. In some implementations, an intelligent card may be personalized by synchronizing with a computer such as a client. The service card 112 may receive from an enterprise at least associated with the service provider 104 that personalization data prior to activation including user credentials, broadband application and at least one of operational flags, rule table or user interface. The personalization data present in the card may be updated after activation using at least one of the following methods: wireless or over the air messages containing special and secure update instructions; internet or client application running on a PC connected to the service card 112 via the host device or a card reader; internet application wirelessly connecting to the service card 112 via the host consumer device or user interface application of the service card 112 itself, and/or other methods.

In some implementations, provisioning of the intelligent card can be based, at least in part, on the distribution entity (e.g., service provider, wireless operator, user). For example, the intelligent card may be distributed by a service provider such as a wireless provider. In this case, the intelligent card may be activated in response to at least initial insertion into a host device. The antenna mode may be set to physical authentication only by default. In some examples, the user may self-select a PIN authentication to prevent unauthorized use or through a PC cradle and plug-in management software if the host device does not have a screen and keyboard. In the wireless-operator implementation, the intelligent card may require device authentication before activation. In some examples, the user may provision service data (e.g., subscription information) using one of several methods. In addition, the user may add user authentication and network authentication. In the user-provided implementation, the user may acquire the intelligent card from, for example, a retail store or other channels like OEM host device manufacturers. In this case, the user may activate the card in a plurality of different devices with provider selected provisioning.

In regards to activating for service transactions, the intelligent card may be configured in memory mode when user acquires the card from, for example a wireless operator, a third-party provider, and/or others. Activation of the card may include the following two levels: 1) physically, specifying antenna availability under a specific set of circumstances desired by the provider; and b) logically, at the service provider signifying activation of the service vehicle carried on the card. In some implementations, activation may be based, at least in part on device distributor, antenna availability selection, and/or type of host device as illustrated in Table 2 below.

TABLE 2

| Plug-in Seller and Mode of distribution | Plug-In Initial State and Antenna Availability Choice | Device Has No Screen/ Keyboard | Device Has Screen & keyboard |
| --- | --- | --- | --- |
| Service provider (wireless operator) ships plug-in directly to the subscriber or through participating resellers/distributors etc. | Plug-In is in Memory Mode, It is fully personalized with user's account information and Antenna mode is set to Physical Authentication | Manual: User has to call service provider's number to activate his account, the Device can only work with a single account. User can also access service provider's site on the internet using another PC to activate his account | If the device is capable of wireless access, upon insertion, the plug-in spawns a web page and takes the user to service provider's website. The user self activates his account by entering his account number and matching registration information (initial password). The user can also optionally select a PIN (change Antenna availability to user authentication) at the same time. If Internet connection is not available, the device can automatically dial a voice call to service provider's number for account activation. If wireless connection is not available as well (device is only a PDA), the user has to fallback to manual activation (see left) |
| WNO: Wireless Network Operator Ships plug-in as an accessory with an advice for compatible devices, User can select his preferred | Plug-In is in Memory Mode, it is unpersonalized. Antenna Availability is set to Network authentication is set to On. Plug-In will bind to first device it is | Not Applicable | Assumption: Device has functional wireless connection. Plug-In will spawn an internet connection to the operator portal and the connection management application |

TABLE 2-continued

| Plug-in Seller and Mode of distribution | Plug-In Initial State and Antenna Availability Choice | Device Has No Screen/ Keyboard | Device Has Screen & keyboard |
|---|---|---|---|
| host device and attempt to operate his plug-in with, to avail of the service | inserted in and where network authentication is successful | | will be downloaded upon user confirmation. User can reject download and choose to manually provision service provider data by going to a third party service provider or directly to the service provider website. Plug-In is bound to the device and to the network provider's network. If the same device is unlocked and used on another network, the plug-in will cease to operate and will revert back to memory mode. When removed from the device, the plug-in will revert to the memory mode. |
| OEM 1: Cellphone manufacturer | Device Authentication (device comes bundled with a cellphone) | Not Applicable | Option A: Device Manufacturer offers a connection management application, rest of the process remains as above Option B: Wireless Operator offers a connection management application. User goes to the wireless operator portal and downloads this application Over the Air. The rest of the process then remains the same as above Option C: User navigates to a third party connection management application (example paypal or Google). Sign up is offered to participating service provider and applications are personalized on the plug-in Over the Internet Option D: User navigates to service provider's website and activates a new account which is personalized over the Internet on the plug-in |
| OEM 2: Other manufacturer | Device Authentication | User has to cradle the device to the PC with an internet connection and sign-up on the PC by going to an service provider's website directly. Account is downloaded over the internet via the cradle and then the device is activated. In this process, the plug-in is bound to the device signature. When removed from the host device, the antenna turns off When plugged into another device, the device signature fails and the device behaves like a mass memory device only | If the device has wireless connection (it is a wireless PDA): Same as above If the device has no wireless connection (it is an unconnected PDA): Same as left |

The illustrated chart is for example purposes only. The user may activate an intelligent card using the same, some, or different processes without departing from the scope of this disclosure.

Figure 5A:
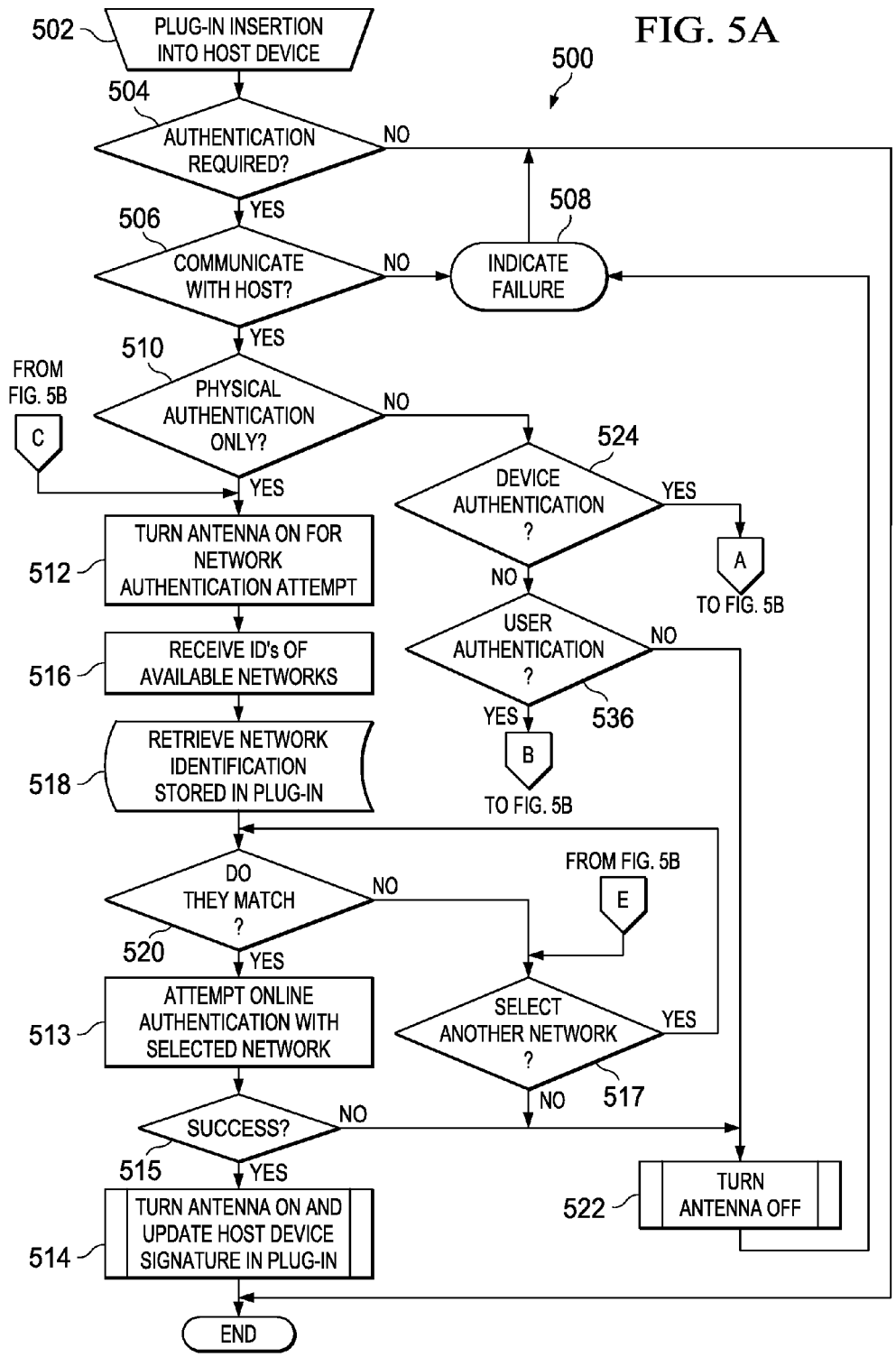
FIGS. 5A and 5b are flow charts illustrating an example method for initialize an intelligent card.
Figure 5B:
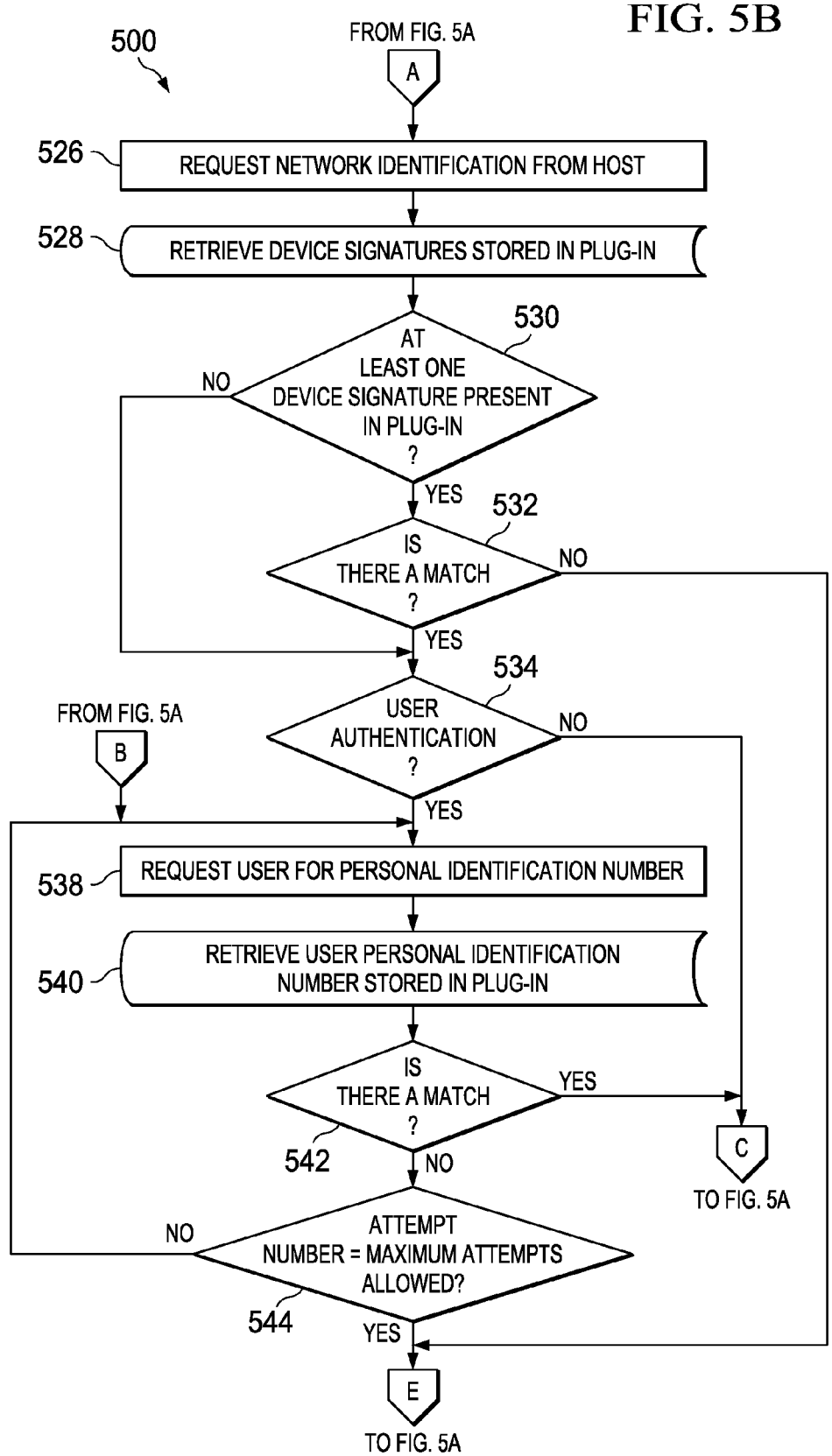

FIG. 5 is a flow chart illustrating an example method 500 for automatically bootstrapping an intelligent card in response to at least insertion into a host device. In general, an intelligent card may execute one or more authentication procedures prior to activation. Many of the steps in this flowchart may take place simultaneously and/or in different orders as shown. System 100 may use methods with additional steps, fewer steps, and/or different steps, so long as the methods remain appropriate.

Method 500 begins at step 502 where insertion into a host device is detected. For example, the service card 112 may detect insertion into the consumer device 102. If authentication is not required for any aspect of the intelligent card at decisional step 504, then execution ends. If authentication is required for at least one aspect, then execution proceeds to decisional step 506. If communication with the host device includes one or more errors, then, at step 508, a failure is indicated to the user. In the example, the service card 112 may present an indication of a communication error to the user using the GUI 110. If a communication error is not detected at decisional step 506, then execution proceeds to decisional step 510. In some implementations, the intelligent card uploads an SD driver to the host device. If the intelligent card only requires physical authentication, then execution proceeds to step 512. The antenna is turned temporarily on to attempt network authentication at step 512. As for the example, the service card 112 may activate the antenna for wireless transactions and update local memory with the host-device signature. At step 516, the intelligent card transmits a request for all available network IDs that are within range. Next, at step 518, the intelligent card retrieves a locally-stored network ID. If the stored network ID matches with one of network IDs retrieved at decisional step 520, then the card performs online authentication with the service provider by transmitting user credentials using an authentication protocol as specified by the service provider at step 513. If this online authentication is successful ad decisional step, the card is activated at step 514. If not successful, then execution proceeds to decisional step 517. If another network is selected, then execution returns to decisional step 520. If another network is not selected, then the antenna is deactivated at step 522.

Returning to decisional step 510, if the authentication is not only physical authentication, then execution proceeds to decisional step 524. If the authentication process includes device authentication, then, at step 526, the intelligent card transmits a request for a device ID to the host device. At step 528, the intelligent card retrieves a locally stored device signatures. If the intelligent card does not include at least one device signature, then execution proceeds to decisional step 534. If the intelligent card includes one or more device signatures, then execution proceeds to decisional step 532. If one of the device signatures matches the request device ID, then execution proceeds to decisional step 534. If the signatures and the request device ID do not match, then execution proceeds to step 522 for deactivation. If user authentication is not included in the authentication process, then execution proceeds to decisional step 512 for physical authentication. If user authentication is included at decisional step 534, then execution proceeds to step 538.

Returning to decisional step 524, if the authentication process does not include device authentication, then execution proceeds to decisional step 536. If user authentication is not included in the process, then, at step 522, the intelligent card is turned off. If user authentication is included, then, at step 538, the intelligent card request a PIN number from the user using the host device. While the user authentication is described with respect to entering a PIN through the consumer host device, the user may be authenticated using other information such as biometric information (e.g., fingerprint). Again returning to the example, the service card 112 may present a request for the user to enter a PIN through the GUI 110. At step 540, the intelligent card retrieves a locally-stored PIN. If the request PIN and stored PIN match at decisional step 542, then execution proceeds to decisional step 512 for physical authentication. If the request PIN and the stored PIN do not match at decisional step 542, then execution proceeds to decisional step 544. If the number of attempts have not exceeded a specified threshold, then execution returns to step 538. If the number of attempts has exceed to the threshold, then the antenna is deactivated at step 522. In the example, if the event that the service card 112 fails to authorize the device, network and/or user, the service card 112 may wirelessly transmit an indication to the associated service provider using the broadband technology of the consumer host device 102. In this case, the illustrated method 500 may be implemented as a fraud control process to substantially prevent unauthorized use of the service card 112.

Figure 6:
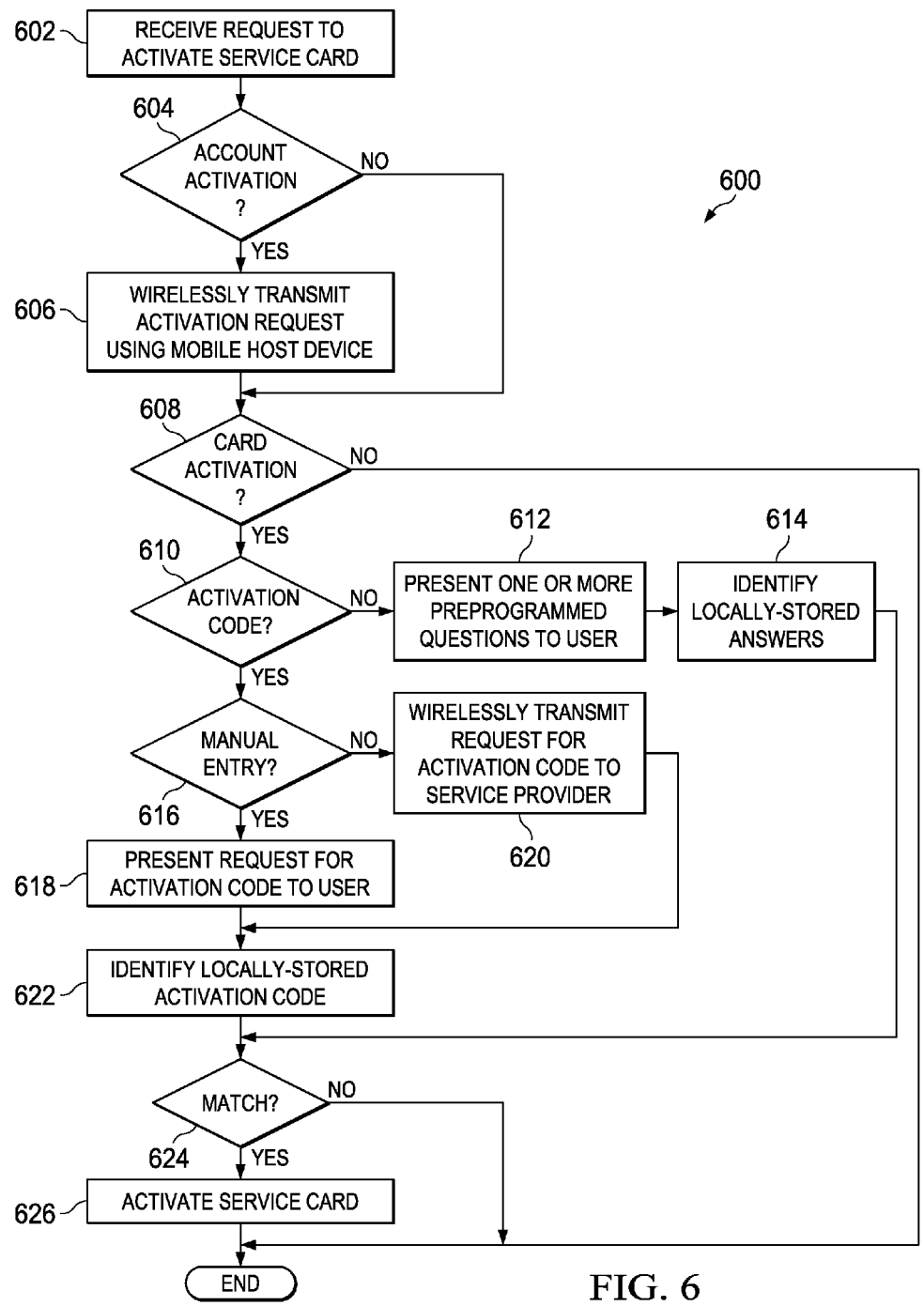
FIG. 6 is a flow chart illustrating an example method for activating a service card.

FIG. 6 is a flow chart illustrating an example method 600 for activating a wireless transaction system including an intelligent card. In general, an intelligent card may execute one or more activation processes in response to, for example, a selection from a user. Many of the steps in this flowchart may take place simultaneously and/or in different orders as shown. System 100 may use methods with additional steps, fewer steps, and/or different steps, so long as the methods remain appropriate.

Method 600 begins at step 602 where a request to activate a service card is received. For example, the user may select a graphical element displayed through the GUI 110 of a consumer host device 102 in FIG. 1. If an account activation is included at decisional step 604, then at step 606, a request to activate the associated service account is wirelessly transmitted to service provider. For example, the service card 112d of FIG. 2 may wireless transmit an activation request to the service provider 104. If an account activation is not included, then execution proceeds to decisional step 608. If card activation is not included, then execution ends. If card activation is included, then execution proceeds to decisional step 610. If an activation code is not included, then at step 612, one or more preprogrammed questions are presented to the user using the GUI of the host device. Returning to the initial example, the service card 112 may identify locally stored questions and present the questions to the user using the GUI 110 of the consumer host device 102. At step 614, locally-stored answers to the programmed questions are identified. Returning to decisional step 610, if an activation code is included, then execution proceeds to decisional step 616. If the activation code is manually entered by the user, then at step 618, a request for the activation code is presented to the user through the GUI of the consumer host device. In the initial example, the service card 112 may present a request for an activation code such as a string of characters to the user through the GUI 110 of the consumer host device 102. If the activation code is not manually entered by the user, then at step 620, the service card wirelessly transmits a request for the activation code using the broadband technology of the host device. In the wireless broadband example, the service card 112 may transmit a request to the service provider using the wireless broadband core network 108. In either case, the locally-stored activation code is identified at step 622. If the locally stored information matches the provided information at decisional step 624, then at step 626, the service card is activated. For example, the service card 112 may activate in response to at least a user entering a matching activation code through the GUI 110. If the provided information does not match the locally stored information, then execution ends.

Figure 7A:
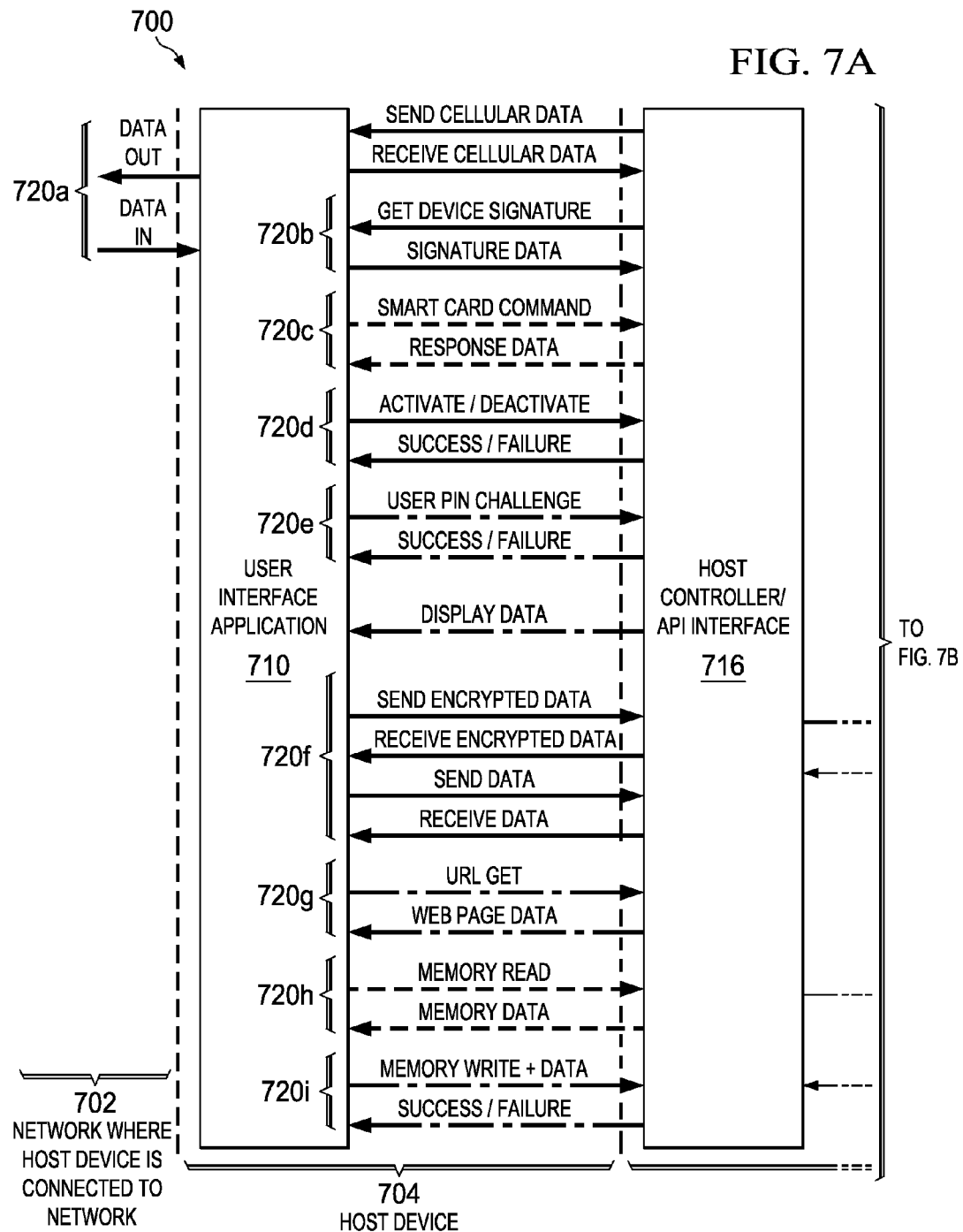
Figure 7C:
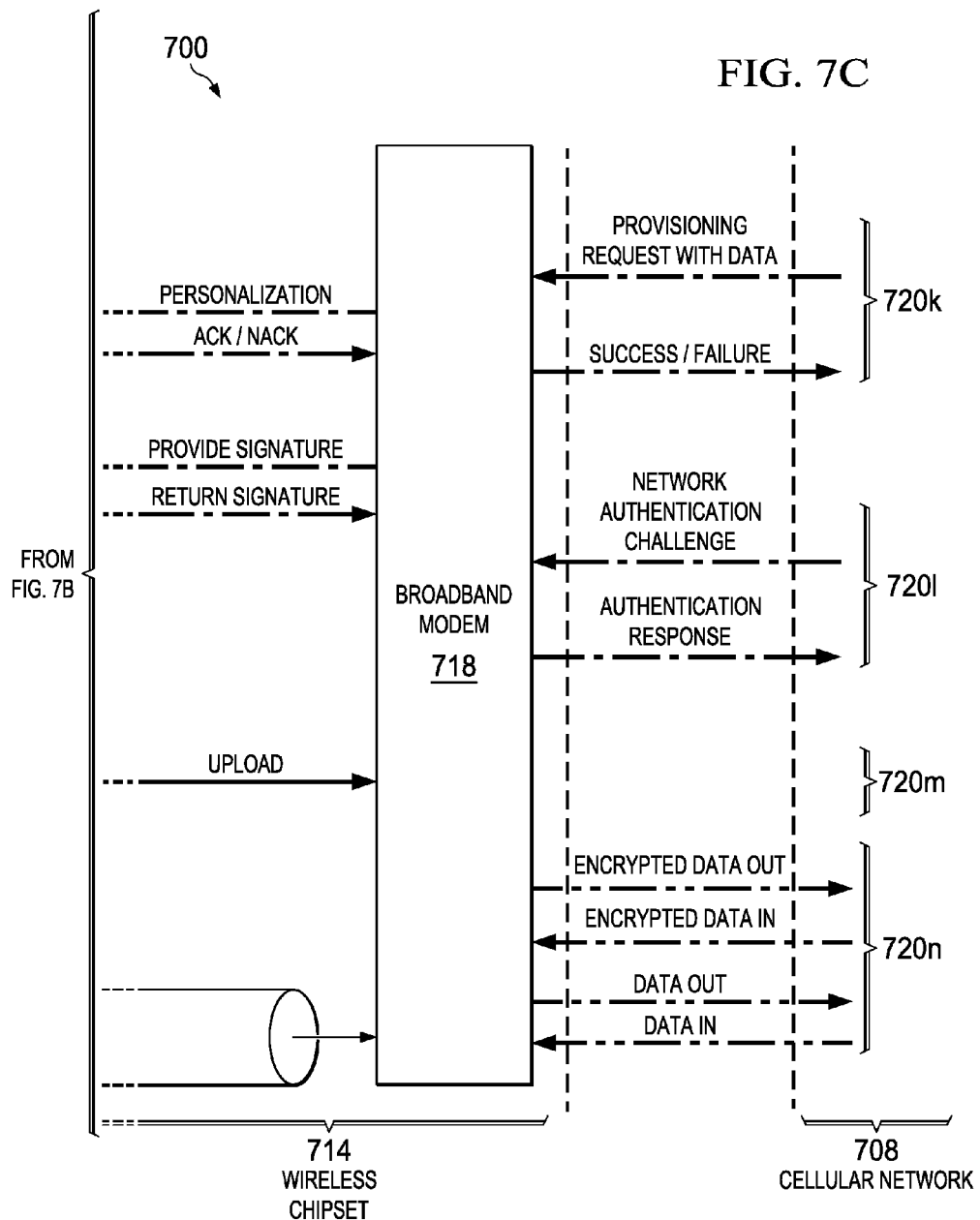

FIGS. 7A-C is an example call flow 700 in accordance with some implementations of the present disclosure. As illustrated, the flow 700 includes a network 702, a host device 704, an intelligent card 706, and a wireless broadband network 708. The host device 704 is configured to communicate with the network 702 and includes a slot for insertion of the intelligent card 706. The intelligent card 706 is configured to transmit commands to and receive data from a user interface application 710 executed by the host device 710 and execute access foreign services independent of the host device 710. The card 706 includes a CPU 712 for accessing services and a wireless chipset 714 for communicating with the wireless broadband network 708. The CPU 712 executes a host controller/API interface 716 configured to transmits commands in a form compatible with the host device 704 and convert data from the host device 704 to a form compatible with the CPU 712. In some implementations, the SIM 722 may include a personalization engine, a credentials database, cryptographic engine and a smart-card interface.

As illustrated, the flow 700 may include multiple sessions 720 between the host device 704 and the card 706 and between the card 706 and the wireless broadband network 708. The session 720 a illustrates a session managed by the card 706 using the network capabilities of the host device 710. In this example, the card 706 transmits data for transmission through a network connected to the host device 704, and after receiving the data, the host device 704 transmits the data to the network 802. In response to receiving data from the network 702, the host device 704 may automatically transmit the received data to the card 706. In some implementations, the card 706 may transmit a request for a device signature to the host device 704 as illustrated in session 720b. For example, the card 706 may request the device signature during a bootstrapping process. The session 720c illustrates that a user may submit commands to the card 706 through the interface of the host device 704. For example, the user may request that the card display the user's service history through the interface of the host device 704.

In some implementations, the card 706 may receive a command to activate or deactivate the antenna through the host device 704 as illustrated in session 720d. For example, a service provider may identify irregular transactions and transmit a command through the network 702 to deactivate the card 706. The card 706 may authorize a user by requesting a PIN using the host device 704. As illustrated in session 720e, the user may submit a PIN to the card 706 using the interface of the host device 704, and in response to an evaluation of the submitted PIN, the card 706 may present through the host device 704 an indication that the user verification is successful or has failed. In some implementations, the card 706 may receive and transmit encrypted data between the host device and/or network 708 as as illustrated in session 720f and 720m. In some implementations, the user may present offline Web pages stored in the card 706 as illustrated in session 720. For example, the card 706 may receive a request to present an offline Web page from the user using the host device 704 and present the offline page using the URL in the request. In some implementations, data stored in the memory of the card 706 may be presented through, for example, the host device 704 as illustrated in session 720h. For example, the user may request specific information associated with a transaction on a certain data and the card 706 may retrieve the data and present the data to the user using the host device 704. In addition, the user may write data to the memory in the card 706 as illustrated in session 720i. For example, the user may save a picture taken by the host device on the memory in the card by writing to it In regards to session between the card 706 and the access point, the flow 700 illustrates the personalization session 720k and the transaction session 720l. In regards to personalization, a service provider may personalize a card 706 with user credentials, user applications, Web pages, and/or other information as illustrated in session 720k. For example, the wireless broadband network 708 may transmit a provisioning request to the card 706 including associated data. The protocol translation 718 may translate the personalization request to a form compatible with the card 706. In response to at least the request, the CPU 712 transmit an indication whether the personalization was a success or not using the protocol translation 718. Upon power on of the intelligent card, the wireless broadband network 708 may submit a transaction challenge to the card 706 as illustrated in session 720l. In this case, the card 706 may identify a device signature of the host device 704, present associated data to the user through the host device 704, and transmit the signature to the wireless broadband network 708 using the protocol translation 718.

Figure 8:
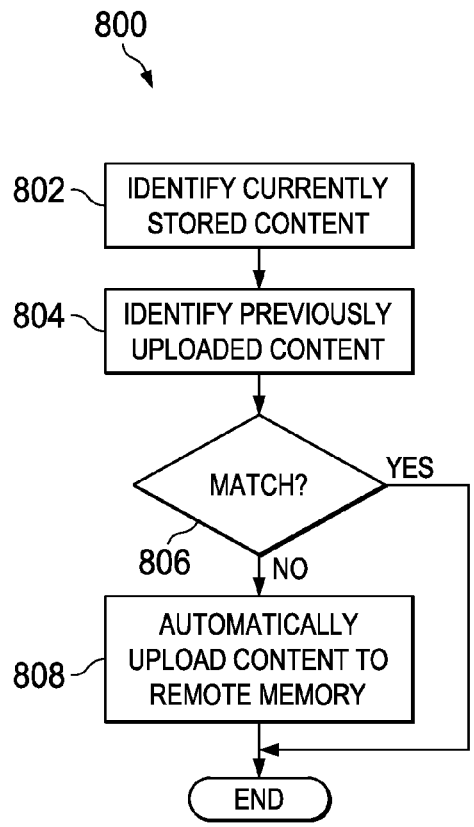
FIG. 8 is a flow chart illustrating an example method for synchronizing memory.

FIG. 8 is a flow chart illustrating an example method 800 for synchronizing local and remote memory. In general, an intelligent card may automatically upload content from a mobile device to remote memory. Many of the steps in this flowchart may take place simultaneously and/or in different orders as shown. System 100 may use methods with additional steps, fewer steps, and/or different steps, so long as the methods remain appropriate.

Method 800 begins at step 802 where currently stored content is identified. At step 804, previously uploaded content is identified. If they match at decisional step 806, then execution ends. If they do not match, then at least a portion of the currently stored content is uploaded to the remote memory at step 808.

Figure 9:
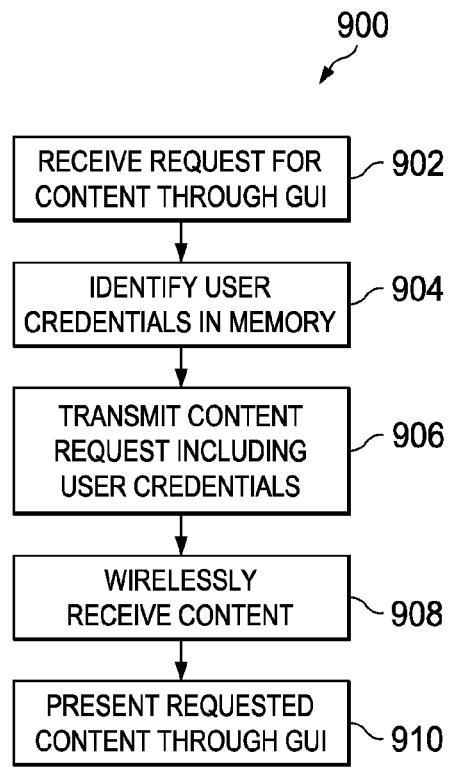
FIG. 9 is a flow chart illustrating an example method for accessing content using broadband services.

FIG. 9 is a flow chart illustrating an example method 900 for accessing content using an intelligent card. In general, an intelligent card may transmits a content request based, at least in part, on locally-stored security information. Many of the steps in this flowchart may take place simultaneously and/or in different orders as shown. System 100 may use methods with additional steps, fewer steps, and/or different steps, so long as the methods remain appropriate.

Method 900 beings at step 902 where a request for content is receive through a GUI of a user device. In response to at least the request, locally-stored user credentials are identified at step 904. A content request including the user credentials is transmitted at step 906. At step 908, the content is wirelessly received. The received content is presented through the GUI at step 910. A number of embodiments of the invention have been described. Nevertheless, it will be understood that various modifications may be made without departing from the spirit and scope of the invention. Accordingly, other embodiments are within the scope of the following claims.

What is claimed is:
1. A service card, comprising:
secure memory that stores user credentials used to securely authenticate the service card and access a service foreign to a consumer host device through a wireless broadband network, the user credentials associated with a broadband service provider;

one or more processors configured to:
  interface an external port of a consumer host device;
  wirelessly communicate RF signals directly with a wireless broadband network;
  present a request for user identification including at least one of a Personal Identification Number (PIN), user ID and password, or biometric signature through a Graphical User Interface (GUI) of the consumer host device;
  verify the submitted user identification with user identification locally stored in the secure memory prior to accessing foreign services;
  when a number attempts to submit user identification exceeds a threshold, deactivate wireless communication;
  when user identification is verified within the threshold:
    access the foreign service using the user credentials in response to at least an event and transmit a service request to the broadband service provider using the wireless broadband network; and
    present information associated with the foreign service through the consumer host device, wherein the information associated with the foreign service is presented through the GUI of the consumer host device;
  wherein the service card is configured to insert into the external port of the consumer host device and is separate from the consumer host device.

2. The service card of claim 1, wherein the service card comprises a microSD card.

3. The service card of claim 1, the foreign service comprises access to a remote memory in a service-provider network for storing information at least partially generated by the consumer host device.

4. The service card of claim 3, wherein the information comprises at least one of video, images, or audio.

5. The service card of claim 1, wherein the one or more processors further configured to:
  generate an authentication response based, at least in part, on the user credentials; and
  execute a locally-stored service application for accessing the services independent of the consumer host device.

6. The service card of claim 1, the one or more processors further configured to selectively switch an RF antenna between an activate state and an inactivate state in response to at least an event.

7. The service card of claim 6, wherein the switching event includes a selection through a GUI of the consumer host device.

8. The service card of claim 1, wherein the wireless RF signals comprise at least one of LTE, WiMAX, HSPA, HSDPA, UMB, GPRS, EDGE or other 802.1x signals.

9. The service card of claim 1, the one or more processors further configured to translate signals between wireless broadband protocols and a device-interface protocol.

10. The service card of claim 1, the one or more processors further configured to decrypt received signals prior to processing and encrypt at least part of an authentication request prior to wireless transmission.

11. The service card of claim 1, the one or a more processors further configured to authenticate at least one of a network of a service-provider wireless broadband network, the consumer host device, or a user.

12. The service card of claim 11, the one or more processors further configured to deactivate an antenna in response to at least a failure to authenticate the at least one of the network of the consumer host device, the service-provider wireless broadband network, or the user.

13. The service card of claim 1, wherein the service card is initialized in response to at least insertion in the port of the consumer host device.

14. The service card of claim 1, the one or more processors further configured to execute one or more authentication processes in response to at least insertion in the port of the consumer host device.

15. The service card of claim 14, wherein the one or more authentication processes authenticate at least one of a network, a consumer host device, or a user.

16. The service card of claim 1, the one or more processors further configured to activate the service card and transmit to a network element a request to activate an associated user account in response to at least a user request or an initial insertion into the consumer host device.

17. The service card of claim 16, wherein the service card is activated based, at least in part, on a user manually entering an activation code through the GUI of the consumer host device.

18. The service card of claim 1, wherein the service card accesses the foreign service independent of loading a driver onto the consumer host device.

19. The service card of claim 1, wherein the service card emulates a customer premises equipment (CPE) when communicating with the wireless broadband network.

20. The service card of claim 1, the one or more processors further configured to receive power from the consumer host device.

21. The service card of claim 1, wherein an enterprise at least associated with the service provider uploads personalization data prior to activation, wherein the personalization data includes the user credentials, a service application and at least one of operational flags, a rule table or user interface.

22. The service card of claim 21, the one or more processors further configured to update the personalization data after activation in response to at least one of a wireless signal including secure update instructions or a wired signal through a client connected to the service card.

23. The service card of claim 1, the one or more processors further configured to transmit a notification to a network element in response to an activity violating one or more fraud control rules.

24. A method performed by a service card, comprising:
  physically interfacing an external port of a consumer host device;
  wirelessly receiving RF signals from and transmitting RF signals to a wireless broadband network;
  storing user credentials used to securely authenticate a card and access a service foreign to the consumer host device through the wireless broadband network independent of the consumer host device, the user credentials associated with a broadband service provider; accessing the foreign service using the user credentials in response to at least an event;
  presenting a request for user identification including at least one of PIN, user ID and password, or biometric signature through a GUI of the consumer host device;
  verifying the submitted user identification with user identification locally stored prior to accessing foreign services;
  when a number attempts to submit user identification exceeds a threshold, deactivating wireless communication;
  when user identification is verified within the threshold, wirelessly transmitting directly to a wireless broadband network a service request to the broadband service provider, wherein the service card is separate from the consumer host device; and present information associated with the foreign service through the consumer host device, wherein the information associated with the foreign service is presented through the GUI of the consumer host device.

25. The method of claim 24, wherein the interface comprises an SD card.

26. The method of claim 24, the foreign service comprises access to a remote memory in a service-provider network for storing information at least partially generated by the consumer host device.

27. The method of claim 26, wherein the information comprises at least one of video, images, or audio.

28. The method of claim 24, the foreign service comprises access to content distributed by the broadband service provider.

29. The method of claim 28, wherein the content comprises multimedia content.

* * * * *

UNITED STATES PATENT AND TRADEMARK OFFICE
CERTIFICATE OF CORRECTION

| | |
|---|---|
| PATENT NO. | : 8,776,189 B2 |
| APPLICATION NO. | : 12/209950 |
| DATED | : July 8, 2014 |
| INVENTOR(S) | : Jain |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1153 days.

Signed and Sealed this
Thirteenth Day of October, 2015

Michelle K. Lee
*Director of the United States Patent and Trademark Office*